US009936256B2

(12) United States Patent
Kitahara et al.

(10) Patent No.: US 9,936,256 B2
(45) Date of Patent: Apr. 3, 2018

(54) RECEIVER, RECEPTION METHOD, TRANSMITTER AND TRANSMISSION METHOD

(71) Applicant: Saturn Licensing LLC, New York, NY (US)

(72) Inventors: Jun Kitahara, Saitama (JP); Naohisa Kitazato, Tokyo (JP); Yoshiharu Dewa, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/905,721

(22) Filed: May 30, 2013

(65) Prior Publication Data

US 2014/0150040 A1 May 29, 2014

Related U.S. Application Data

(60) Provisional application No. 61/730,783, filed on Nov. 28, 2012.

(51) Int. Cl.
*H04N 21/472* (2011.01)
*H04N 21/4722* (2011.01)
(Continued)

(52) U.S. Cl.
CPC ... *H04N 21/47202* (2013.01); *H04N 21/4325* (2013.01); *H04N 21/4722* (2013.01);
(Continued)

(58) Field of Classification Search
CPC ............. H04N 21/2343; H04N 21/235; H04N 21/2355; H04N 21/262; H04N 21/47202;
(Continued)

(56) References Cited

U.S. PATENT DOCUMENTS 6,282,713 B1 * 8/2001 Kitsukawa ............. G06Q 30/02
348/E5.105
6,373,534 B1 4/2002 Yasuki et al.
(Continued)

FOREIGN PATENT DOCUMENTS

EP 2 276 215 A1 1/2011
JP 11-027641 A 1/1999
(Continued)

OTHER PUBLICATIONS

U.S. Appl. No. 13/559,188, filed Jul. 26, 2012, Kitazato.
(Continued)

*Primary Examiner* — Nathan Flynn
*Assistant Examiner* — Cynthia Fogg
(74) *Attorney, Agent, or Firm* — Oblon, McClelland, Maier & Neustadt, L.L.P.

(57) ABSTRACT

Disclosed herein is a receiver including: a reception section adapted to receive AV, namely audio and visual content; a registration section adapted to register related content relating to the AV content based on control information included in an application program executed in response to the AV content; and a presentation control unit adapted to exercise control in such a manner that if the registered related content is selected, the selected related content is presented.

18 Claims, 29 Drawing Sheets

(51) Int. Cl.
*H04N 21/858* (2011.01)
*H04N 21/432* (2011.01)
*H04N 21/81* (2011.01)

(52) U.S. Cl.
CPC ... *H04N 21/47214* (2013.01); *H04N 21/8166* (2013.01); *H04N 21/8586* (2013.01)

(58) Field of Classification Search
CPC ......... H04N 21/47214; H04N 21/4722; H04N 21/8166; H04N 21/8586; H04N 21/4622; H04N 21/23892; H04N 21/8173; H04N 21/4331; H04N 21/4431; H04N 21/4325
USPC .......................................................... 725/93
See application file for complete search history.

(56) References Cited

U.S. PATENT DOCUMENTS

| | | | |
|---|---|---|---|
| 6,415,438 B1* | 7/2002 | Blackketter et al. | 725/136 |
| 7,134,133 B1* | 11/2006 | Wugofski | 725/39 |
| 7,158,047 B2* | 1/2007 | Ushida | 340/12.54 |
| 7,222,155 B1* | 5/2007 | Gebhardt et al. | 709/204 |
| 2003/0027592 A1* | 2/2003 | Hashimoto et al. | 455/556 |
| 2003/0126599 A1* | 7/2003 | Novak et al. | 725/32 |
| 2004/0021793 A1* | 2/2004 | Takatori | H04H 20/93 348/461 |
| 2004/0068750 A1* | 4/2004 | Maa | 725/113 |
| 2004/0153385 A1* | 8/2004 | Allibhoy et al. | 705/35 |
| 2006/0156371 A1* | 7/2006 | Maetz et al. | 725/132 |
| 2006/0242161 A1* | 10/2006 | Ten Kate et al. | 707/100 |
| 2007/0136773 A1* | 6/2007 | O'Neil | H04N 7/17318 725/100 |
| 2007/0250901 A1* | 10/2007 | McIntire et al. | 725/146 |
| 2007/0275654 A1* | 11/2007 | Danjyo | 455/3.01 |
| 2007/0294265 A1* | 12/2007 | Askew | G06F 17/30884 |
| 2008/0005126 A1* | 1/2008 | Sankaran | G06F 17/3002 |
| 2008/0070548 A1* | 3/2008 | Cha et al. | 455/411 |
| 2008/0216134 A1* | 9/2008 | Tecot et al. | 725/92 |
| 2008/0260352 A1* | 10/2008 | Turner | 386/95 |
| 2008/0282297 A1* | 11/2008 | Park | 725/86 |
| 2010/0154012 A1* | 6/2010 | Clavenna et al. | 725/109 |
| 2011/0047571 A1* | 2/2011 | Zhang et al. | 725/40 |
| 2011/0075990 A1* | 3/2011 | Eyer | H04N 5/76 386/241 |
| 2011/0088075 A1 | 4/2011 | Eyer | |
| 2011/0138432 A1 | 6/2011 | Mitra et al. | |
| 2011/0219386 A1* | 9/2011 | Hwang et al. | 719/328 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302497 A1* | 12/2011 | Garrett | G06Q 20/10 715/736 |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2011/0314491 A1* | 12/2011 | Delidais et al. | 725/23 |
| 2011/0321083 A1* | 12/2011 | Rouse et al. | 725/32 |
| 2012/0019724 A1* | 1/2012 | Thompson et al. | 348/584 |
| 2012/0023525 A1* | 1/2012 | Rothschild et al. | 725/44 |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1* | 3/2012 | Dewa | H04N 21/25816 725/116 |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084825 A1* | 4/2012 | Sharma et al. | 725/109 |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1* | 11/2012 | Eyer | H04N 21/8133 386/241 |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |
| 2014/0090001 A1* | 3/2014 | Das | H04N 21/4722 725/112 |

FOREIGN PATENT DOCUMENTS

| | | |
|---|---|---|
| JP | 2005-217941 A | 8/2005 |
| JP | 2009044762 A2 | 2/2009 |
| JP | 2009-065712 A | 3/2009 |
| JP | 2012029200 A2 | 2/2012 |

OTHER PUBLICATIONS

U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
http://www.oipf.tv/, Open IPTV Forum: OIPF, Release 1 Specification, vol. 5—Declarative Applciation Environment, [V1.1]—[Oct. 8, 2009].
International Search Report issued Dec. 10, 2013 in PC/JP2013/0080977 (with English language translation).
Extended European Search Report dated Mar. 30, 2016 in Patent Application No. 13859274.6.
Japanese Notice of Reasons for Refusal dated Nov. 15, 2017 in Application No. 2014-525667 with English translation, 7 pages.

* cited by examiner

FIG. 7

| Bookmark Collection Class | | 1. Bookmarking |
|---|---|---|
| Method | Bookmark addbookmark(String name, String uri, Binary icon ) | |
| Arguments | name | Program or content title |
| | uri | Application server uri |
| | icon | High-resolution video stills captured from the video that was displayed just prior to the bookmark event |

FIG.9

| 1.Bookmarking | |
|---|---|
| Bookmark Collection Class | |
| Method | Bookmark addbookmark( Integer time, String name, String uri, Binary icon, Integer majorChannel, Integer minorChannel ) |
| Arguments — time | Relative timing within the program or content the bookmark event occurred |
| name | Program or content title |
| uri | URI of VoD server or local storage |
| icon | High-resolution video stills captured from the video that was displayed just prior to the bookmark event |
| majorChannel | The major channel number |
| minorChannel | The minor channel number |

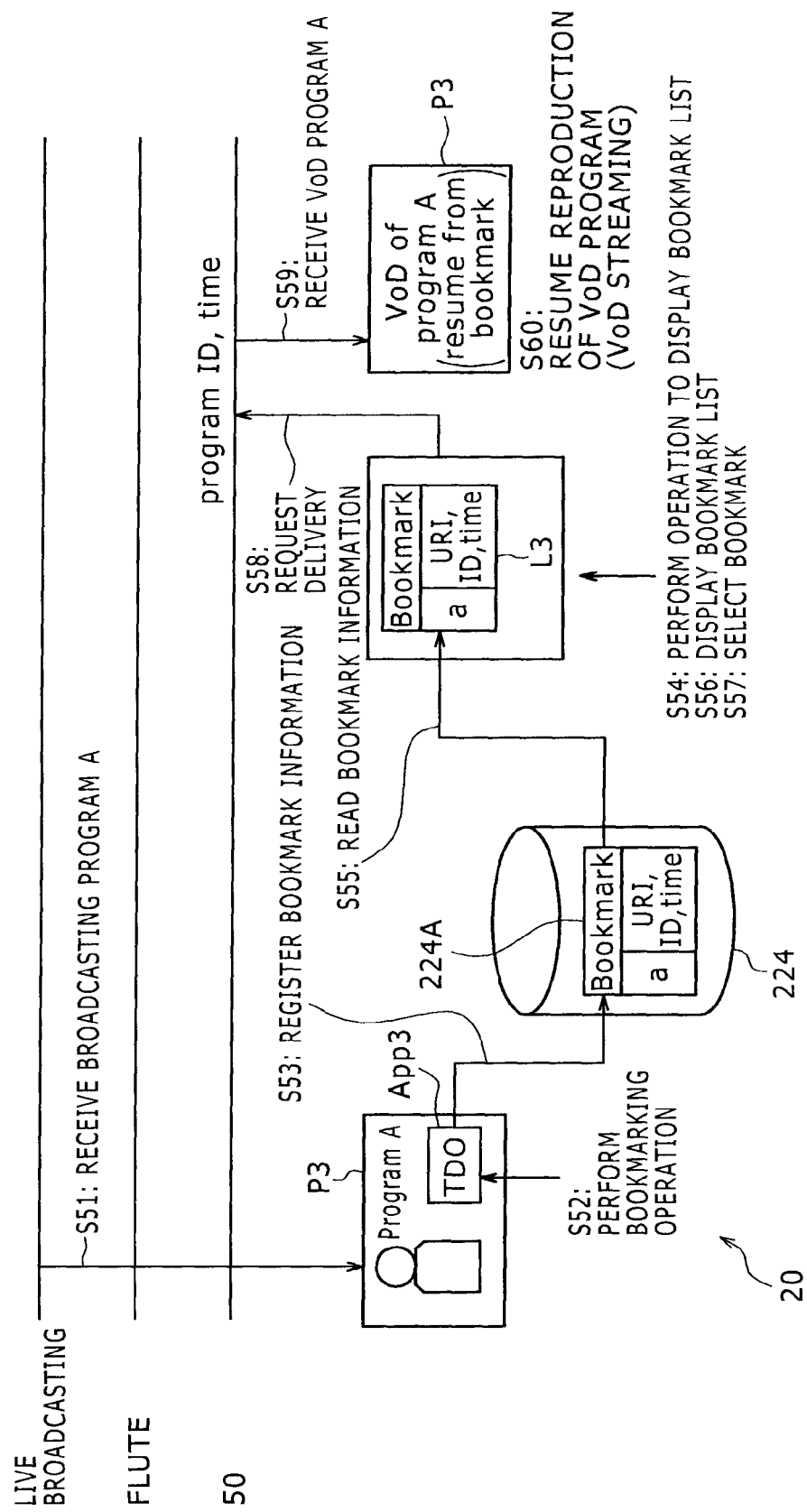

FIG. 11

| Media playback extensions to video/broadcast | 2. Change video angle/3. Change audio tracks |
|---|---|
| Method | AVComponent[] getComponent(Integer componentType) |
| Argument | ComponentType | Returns a collection of AVComponent values representing the components of the specified type in the current stream. |
| Method | AVComponent[] getCurrentActiveComponents( Integer componentType ) |
| Argument | ComponentType | Returns a collection of AVComponent values representing the currently active components of the specified type that are being rendered. |
| Method | void selectComponent( AVComponent component ) |
| Argument | Component | A component object available in the stream currently being played. |
| Method | void unselectComponent( AVComponent component ) |
| Argument | Component | The component to be stopped. |

FIG.12

2. Change video angle/3. Change audio tracks(cont'd)

| The AVComponent class | | |
|---|---|---|
| Properties | type | Type of the component stream. (e.g. COMPONENT_TYPE_VIDEO) |
| | encoding | The encoding of the stream. |
| | encrypted | Flag indicating whether the component is encrypted or not. |
| | aspectRatio | For components of type "video", indicates the aspect ratio of the video or undefined if the aspect ratio is not known. |
| | language | For components of type "audio" or type "subtitle", an ISO 639 language code representing the language of the stream. |
| | audiodescription | For components of type "audio", has value true if the stream contains an audio description intended for people with a visual impairment, false otherwise. |
| | audioChannels | For components of type "audio", indicates the number of channels present in this stream |
| | hearingImpaired | For components of type "subtitle", has value true if the stream is intended for the hearing-impaired |
| | video angle | For components of type "video", indicates the video angle. |

FIG.13

| 4. Change channel | |
|---|---|
| The video/broadcast embedded object | |
| Method | Channel createChannelObject( Integer idType, Integer onid, Integer tsid, Integer sid, Integer sourceID, String ipBroadcastID ) |
| Arguments | idType | The type of channel (e.g. ID_ATSC_T) |
| | tsid | transport stream ID |
| | majorChannel | The major channel number |
| | minorChannel | The minor channel number |
| | sourceID | source ID (Optional argument that SHALL be specified when the idType specifies a channel of type ID_ATSC_T.) |
| Method | void setChannel( Channel channel ) | |
| Arguments | channel | The channel to which a switched is requested. |

FIG.14

| 5. Channel information | |
|---|---|
| The video/broadcast embedded object | |
| Method | ChannelConfig getChannelConfig() |
| Argument | (void) |
| The Channel config class | |
| Attribute | ChannelList |  The list of all available channels. |

| The ChannelList class | | |
|---|---|---|
| Method | Channel getChannel( String channelID ) | |
| Argument | channelID | The channel identifier of the channel to be retrieved. |
| Method | Channel getChannelBySourceID( Integer sourceID ) | |
| Argument | sourceID | The ATSC source_ID of the channel to be returned. |

FIG. 15

| 5. Channel information(cont'd) ||  |
|---|---|---|
| The Channnel class || |
| properties | channelType | The type of channel, e.g. TYPE_TV |
| | idType | The type of identification for the channel, e.g. ID_ATSC_T |
| | sourceID | ATSC source_ID value. |
| | name | The name of the channel. |
| | majorChannel | The major channel number, if assigned. |
| | minorChannel | The minor channel number, if assigned. |

FIG.16

6. screen size and resolution

- Screen size can be acquired from property of video /broadcaster object directly.
- Need to add screen size to property.

FIG.17

| | 7. Closed caption control | |
|---|---|---|
| Media playback extensions to video/broadcast | | |
| Method | AVComponent[] getComponent(Integer componentType) | |
| Argument | ComponentType | Returns a collection of AVComponent values representing the components of the specified type in the current stream. |
| Method | AVComponent[] getCurrentActiveComponents( Integer componentType ) | |
| Argument | ComponentType | Returns a collection of AVComponent values representing the currently active components of the specified type that are being rendered. |
| Method | void selectComponent( AVComponent component ) | |
| Argument | Component | A component object available in the stream currently being played. |
| Method | void unselectComponent( AVComponent component ) | |
| Argument | Component | The component to be stopped. |

FIG.19

| 9. PVR | |
|---|---|
| Scheduled Recording APIs | |
| Method | ScheduledRecording record( Programme programme ) |
| Argument programme | The programme to be recorded, as defined in 7.16.2. |
| Method | ScheduledRecording recordAt( Integer startTime, Integer duration, Integer repeatDays, String channelID ) |
| Argument startTime | The start of the time period of the recording |
| duration | The duration of the recording in seconds. |
| repeatDays | Bitfield indicating which days of the week the recording SHOULD be repeated. |
| channelID | The identifier of the channel from which the broadcasted content is to be recorded. |
| Time shift | DAE 7.13.2 |
| Method | String recordNow( Integer duration ) |
| Argument duration | The minimum duration of the recording in seconds. |

FIG. 20

1. NRT download reservation

| 10. NRT | | |
|---|---|---|
| NRTContent APIs | | |
| Method | String registerNRTContent(String contentAccessDownloadDescriptor, Date downloadStart) | |
| Argument | serviceID | NRT-IT service ID value. |
| | contentLinkage | NRT-IT content linkage value. |
| | sourceID | NRT-IT source ID value. |
| | downloadStart | Optional argument indicating the time at which the download should be started. |

FIG.21

| 10. NRT |
|---|
| 2. Cancel NRT download reservation |

NRTContent APIs

| Method | a.Boolean remove( NRTContent nrtcontent ) | |
|---|---|---|
| Argument | nrtcontent | The NRT content to be deleted. |

NRTContent APIs

| Method | Boolean remove( String id ) | |
|---|---|---|
| Argument | id | NRT content object id |

FIG.22

10. NRT

3. Get information of downloading status

| NRTContent APIs | | |
|---|---|---|
| Method | NRTContentCollection getNRTContents( String id ) | |
| Argument | id | Optional argument identifying the downloads to be retrieved. |
| Method | NRTContent item( Integer index ) | |
| Argument | index | The index into the collection. |

FIG.23

| 10. NRT |
|---|
| 4. Start NRT download instantly<br>   - Same APIs of NRT download reservation, where "downloadstart" argument sets to null.<br>5. Terminate NRT download instantly<br>   - Same API of Cancel NRT download reservation.<br>6. Delete local NRT content<br>   - Same API of Cancel NRT download reservation.<br>7. Get Information of NRT content<br>   - Same API of Get information of downloading status. |

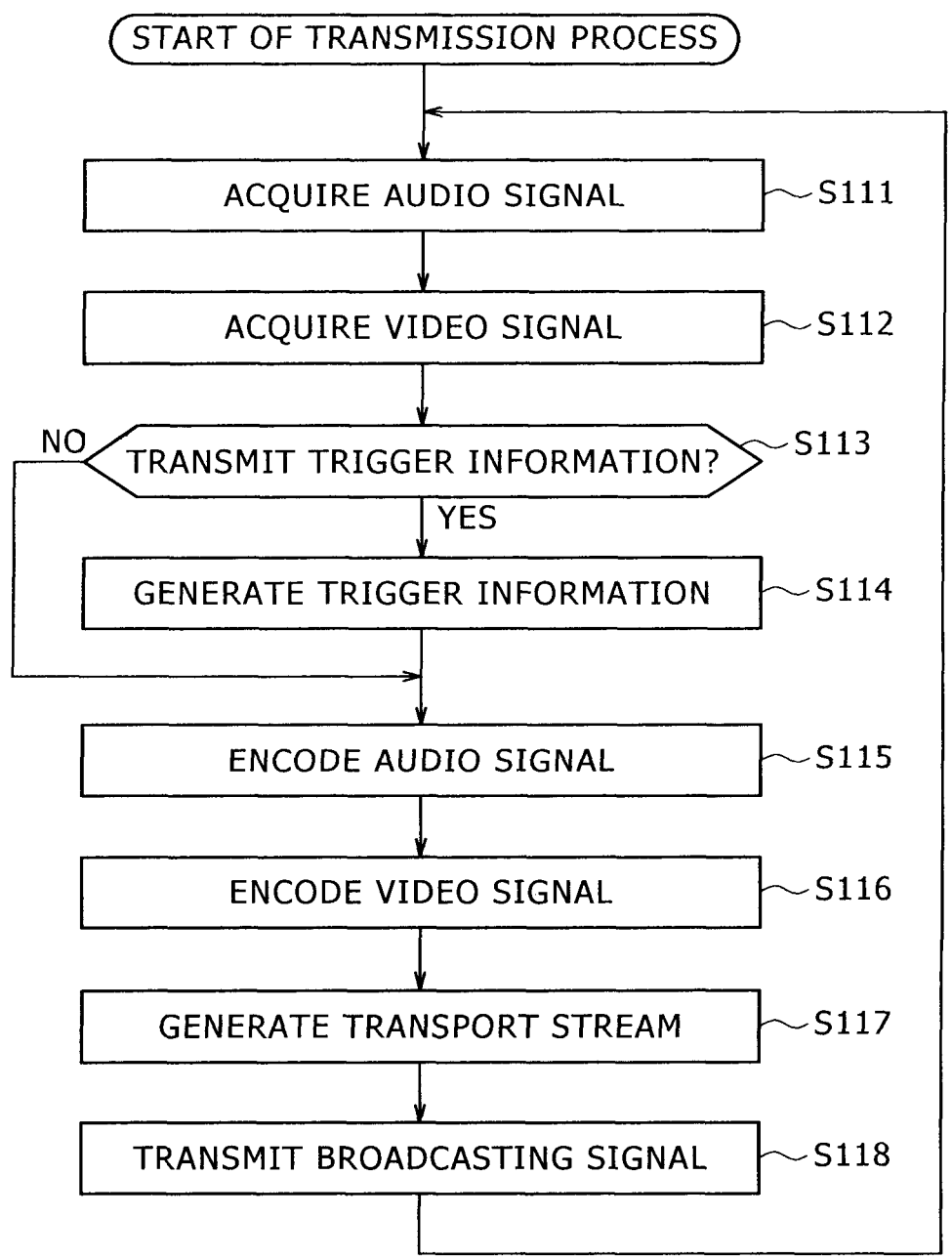

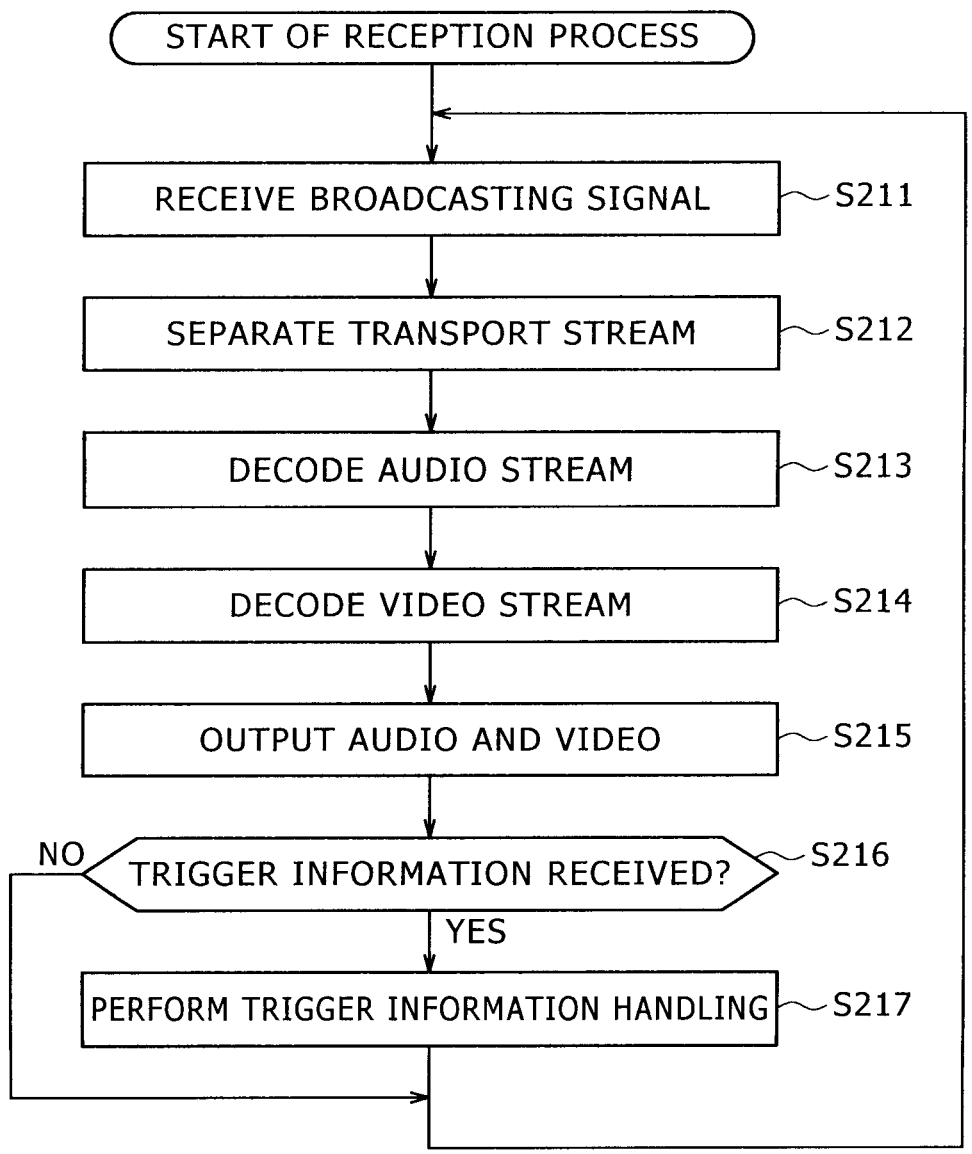

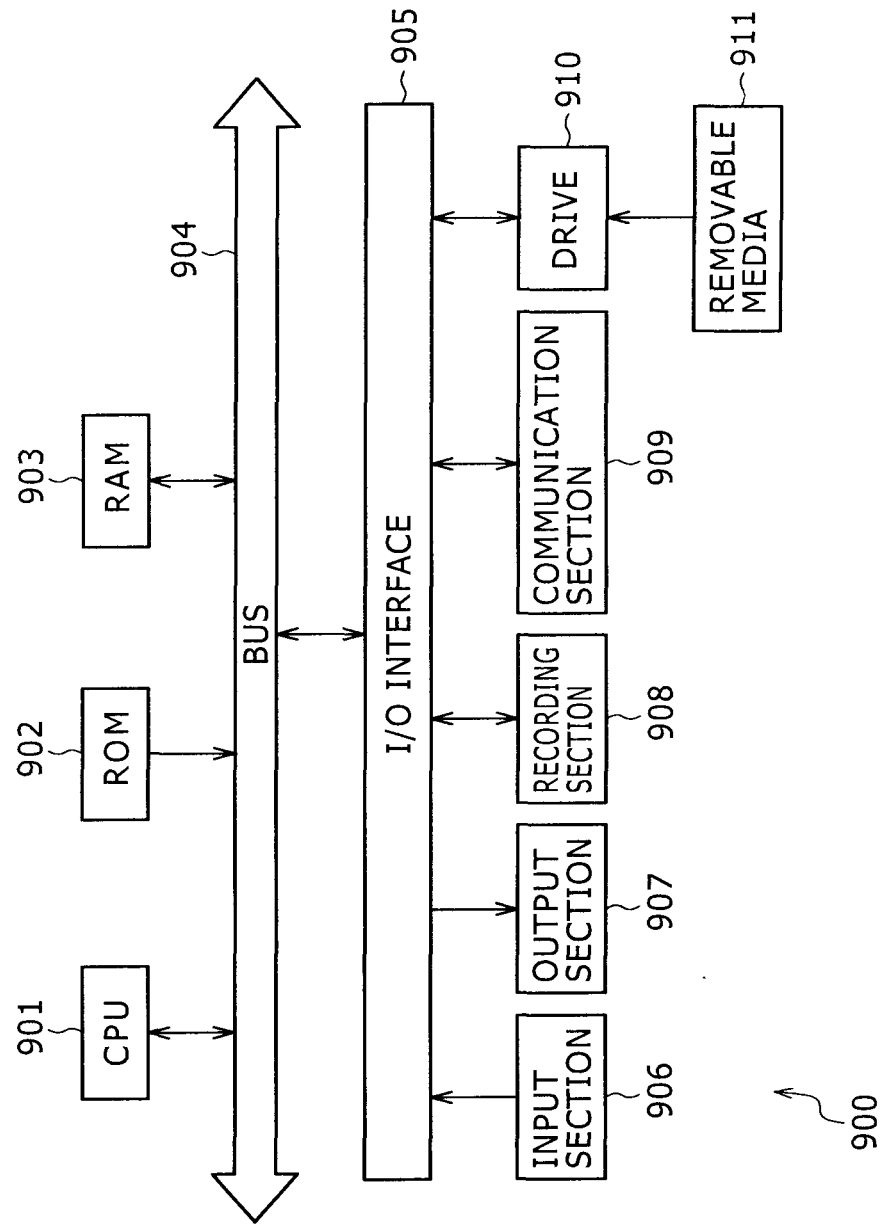

RECEIVER, RECEPTION METHOD, TRANSMITTER AND TRANSMISSION METHOD

CROSS-REFERENCE TO RELATED APPLICATION

This application claims the benefit of priority of Provisional Application Ser. No. 61/730,783, filed Nov. 28, 2012, the entire contents of which is incorporated herein by reference.

BACKGROUND

The present technology relates to a receiver, reception method, transmitter and transmission method, and more particularly, to a receiver, reception method, transmitter and transmission method that can provide a common control method for bookmarking desired content.

The introduction of services for coordinating broadcasting and communication has been under study in recent years to execute an application program delivered over the Internet in response to broadcasting content by using not only a digital broadcasting wave but also communication.

On the other hand, the standardization of the IPTV specification is under way by the OIPF (Open IPTV Forum). The OIPE is developing the DAE (Declarative Application Environment) specification. DAE broadly defines the application development environment as a whole to provide a variety of functionalities related to broadcasting services (refer to, OIPF Release 1 Specification Volume 5—Declarative Application Environment [online]. Open IPTV Forum 2009-10-08 [retrieved on 2012-11-21]. Retrieved from the Internet: <URL:http://www.oipf.tv/>.

SUMMARY

Incidentally, assumably a service coordinating broadcasting and communication will be operated in such a manner as to bookmark related content relating to broadcasting content so as to verify the bookmarked related content later. However, a technical scheme supporting such an operation has yet to be established in the OIPF's DAE specification. As a result, a common control scheme for bookmarking related content is required.

The present technology has been devised in light of the foregoing, and there is a need for the present technology to provide a common control scheme for bookmarking desired content.

A receiver according to a first embodiment of the present technology includes a reception section, registration section and presentation control unit. The reception section receives AV, namely audio and visual content. The registration section registers related content relating to the AV content based on control information included in an application program executed in response to the AV content. The presentation control unit exercises control in such a manner that if the registered related content is selected, the selected related content is presented.

The registration section registers the related content if a given event occurs while the application program is active.

The registration section registers registration information relating to the related content to be registered to a recording section. The presentation control unit presents the related content selected from a list that matches the registration information.

The related content is a webpage. The registration section registers, as the registration information, the URL (Uniform Resource Locator) of the webpage. The presentation control unit displays the webpage acquired according to the URL.

The related content is recorded content obtained by recording the AV content. The registration section registers, as the registration information, identification information of the recorded content. The presentation control unit reproduces the recorded content specified by the identification information.

The registration section registers, as the registration information, time information indicating the reproduction start time of the recorded content together with the identification information. The presentation control unit reproduces the recorded content specified by the identification information from the time indicated by the time information.

The related content is VOD (Video On Demand) content. The registration section registers, as the registration information, identification information of the VOD content. The presentation control unit reproduces the VOD content acquired according to the identification information.

The registration section registers, as the registration information, time information indicating the reproduction start time of the VOD content together with the identification information. The presentation control unit reproduces the VOD content specified by the identification information from the time indicated by the time information.

The control information is a function used to register the related content. The registration section executes the function if an instruction is issued to register the related content.

The application program is an HTML (Hyper Text Markup Language) document written in HTML. The control information is a function written as a script in the HTML document.

The AV content is transmitted through a broadcasting wave. The application program is delivered via the Internet.

The receiver may be a standalone device or an internal block making up a single device.

A reception method according to the first embodiment of the present technology is a reception method of the receiver according to the first embodiment of the present technology described above.

In the receiver and reception method according to the first embodiment of the present technology, AV content is received. Related content relating to the AV content is registered based on control information included in an application program executed in response to the AV content. Control is exercised in such a manner that if the registered related content is selected, the selected related content is presented.

A transmitter according to a second embodiment of the present technology includes an acquisition section and transmission section. The acquisition section acquires an application program to be executed in response to AV content. The transmission section transmits the application program. The application program includes control information used to register related content relating to the AV content.

The transmitter may be a standalone device or an internal block making up a single device.

A transmission method according to the second embodiment of the present technology is a transmission method of the transmitter according to the second embodiment of the present technology described above.

In the transmitter and transmission method according to the second embodiment of the technology, an application program to be executed in response to AV content is acquired. The application program is transmitted. The application program includes control information used to register related content relating to the AV content.

The first and second embodiments of the present technology provide a common control method for bookmarking desired content.

BRIEF DESCRIPTION OF THE DRAWINGS

FIG. 7 is a diagram for describing the bookmarking function in the first mode of operation;

FIG. 9 is a diagram for describing the bookmarking function in the second mode of operation;

FIG. 10 is a diagram for describing a third mode of operation using the bookmarking function;

FIG. 11 is a diagram for describing change video angle/change audio tracks functions;

FIG. 12 is a diagram for describing the change video angle/change audio tracks functions;

FIG. 13 is a diagram for describing a change channel function;

FIG. 14 is a diagram for describing a channel information function;

FIG. 15 is a diagram for describing the channel information function;

FIG. 16 is a diagram for describing a screen size and resolution function;

FIG. 17 is a diagram for describing a closed caption control function;

FIG. 19 is a diagram for describing a PVR function;

FIG. 20 is a diagram for describing an NRT content function;

FIG. 21 is a diagram for describing the NRT content function;

FIG. 22 is a diagram for describing the NRT content function;

FIG. 23 is a diagram for describing the NRT content function;

FIG. 24 is a flowchart for describing a transmission process;

FIG. 25 is a flowchart for describing a reception process;

FIG. 30 is a diagram illustrating a configuration of a computer.

DETAILED DESCRIPTION OF THE PREFERRED EMBODIMENTS

A description will be given below of the embodiments of the present technology with reference to the accompanying drawings.

<Configuration Example of the Broadcasting-Communication Coordination System>

Figure 1:
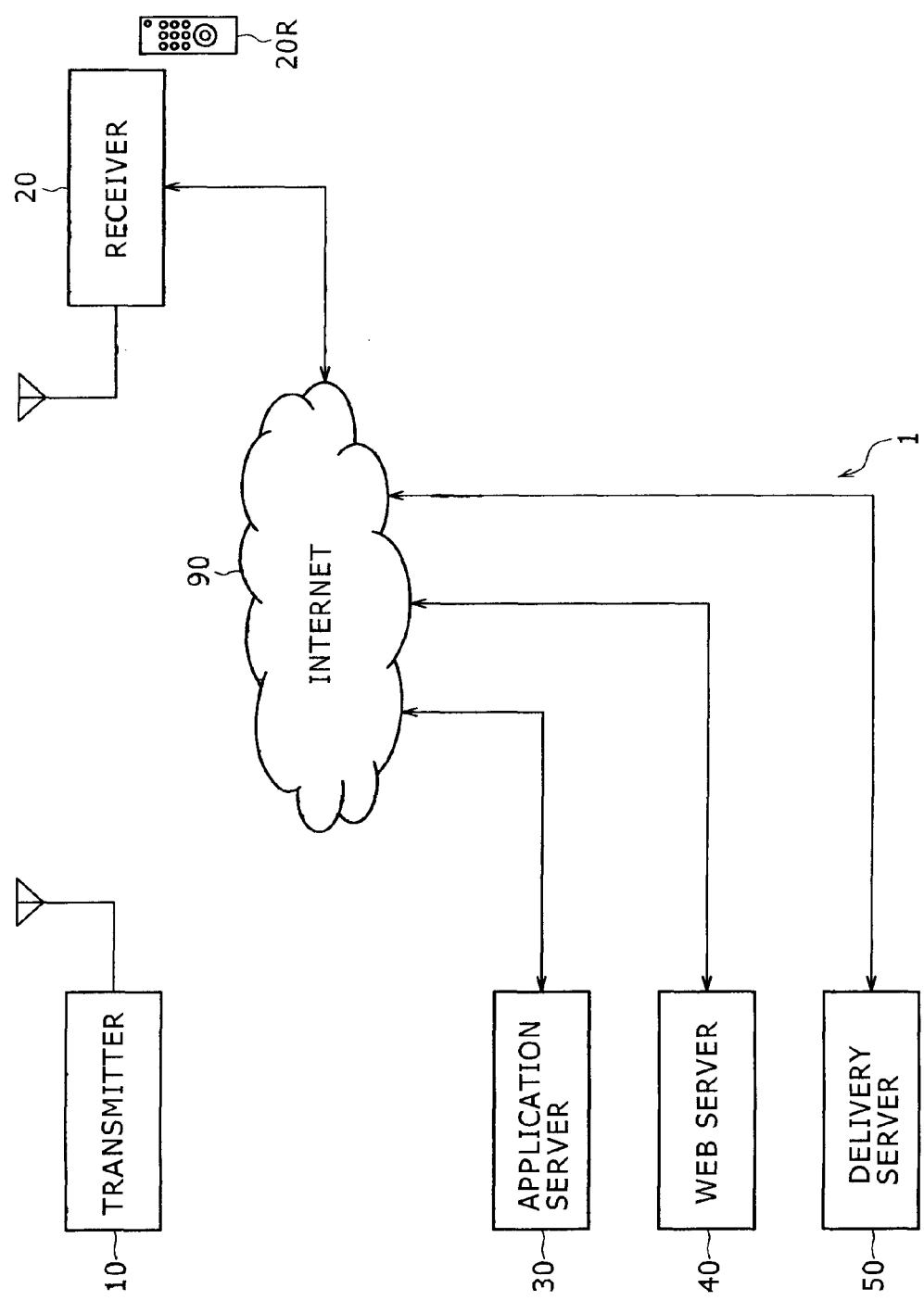
FIG. 1 is a diagram illustrating the configuration of an embodiment of a broadcasting-communication coordination system to which the present technology is applied.

FIG. 1 is a diagram illustrating the configuration of an embodiment of a broadcasting-communication coordination system to which the present technology is applied.

As illustrated in FIG. 1, a broadcasting-communication coordination system 1 includes a transmitter 10, receiver 20, application server 30, web server 40 and delivery server 50. Further, the receiver 20, application server 30, web server 40 and delivery server 50 are connected to each other via an Internet 90.

The transmitter 10 transmits broadcasting content (hereinafter also referred to as a broadcasting program) with a digital television broadcasting signal.

Further, the transmitter 10 transmits trigger information as contained in a digital television broadcasting signal. Here, the term "trigger information" refers to information adapted to control the operation of an application program to be executed in response to broadcasting content.

An application program to be executed according to trigger information will be hereinafter referred to as a TDO (Triggered Declarative Object) application in the description that follows. The TDO application includes an HTML (Hyper Text Markup Language) document.

The receiver 20 is a receiver such as television receiver. The receiver 20 receives a broadcasting signal from the transmitter 10, thus acquiring the picture and sound of broadcasting content. The receiver 20 displays the picture of the broadcasting content on a display and outputs the sound thereof from a speaker.

It should be noted that the receiver 20 can be remote-controlled by using a remote controller 20R.

The application server 30 manages the TDO application. The same server 30 supplies the TDO application via the Internet 90 in response to a request from the receiver 20.

The receiver 20 acquires the TDO application from the application server 30 according to the trigger information from the transmitter 10. Further, the receiver 20 controls the operation of the acquired TDO application according to the trigger information from the transmitter 10.

The web server 40 manages a web site. The web site includes a plurality of web pages made up of an HTML document. The same server 40 supplies the web page via the Internet 90 in response to a request from the receiver 20.

The receiver 20 accesses the web server 40 via the Internet 90, thus acquiring and displaying the web page.

The delivery server 50 stores VOD content (hereinafter also referred to as VOD program) that can be delivered through VOD (Video On Demand). Broadcasting programs that were already broadcast and movies that were already released are among VOD content. The delivery server 50 delivers VOD content via the Internet 90 in response to a request from the receiver 20.

The receiver 20 acquires the picture and sound of the VOD content delivered from the delivery server 50. The receiver 20 displays the picture of the VOD content on the display and outputs the sound thereof from the speaker.

It should be noted that although only the single receiver 20 is shown for the broadcasting-communication coordination system 1 in FIG. 1 to facilitate the description, the same system 1 practically includes the plurality of receivers 20, with each of the receivers 20 receiving broadcasting content from the transmitter 10.

Similarly, although the single transmitter 10 and single application server 30 are shown for the broadcasting-communication coordination system 1 in FIG. 1, the plurality of transmitters 10 and the plurality of application servers 30 are practically provided for each broadcaster. Still further, the plurality of web servers 40 and the plurality of delivery servers 50 are also provided for each broadcaster.

The broadcasting-communication coordination system 1 is configured as described above.

<Configuration Example of the Transmitter>

Figure 2:
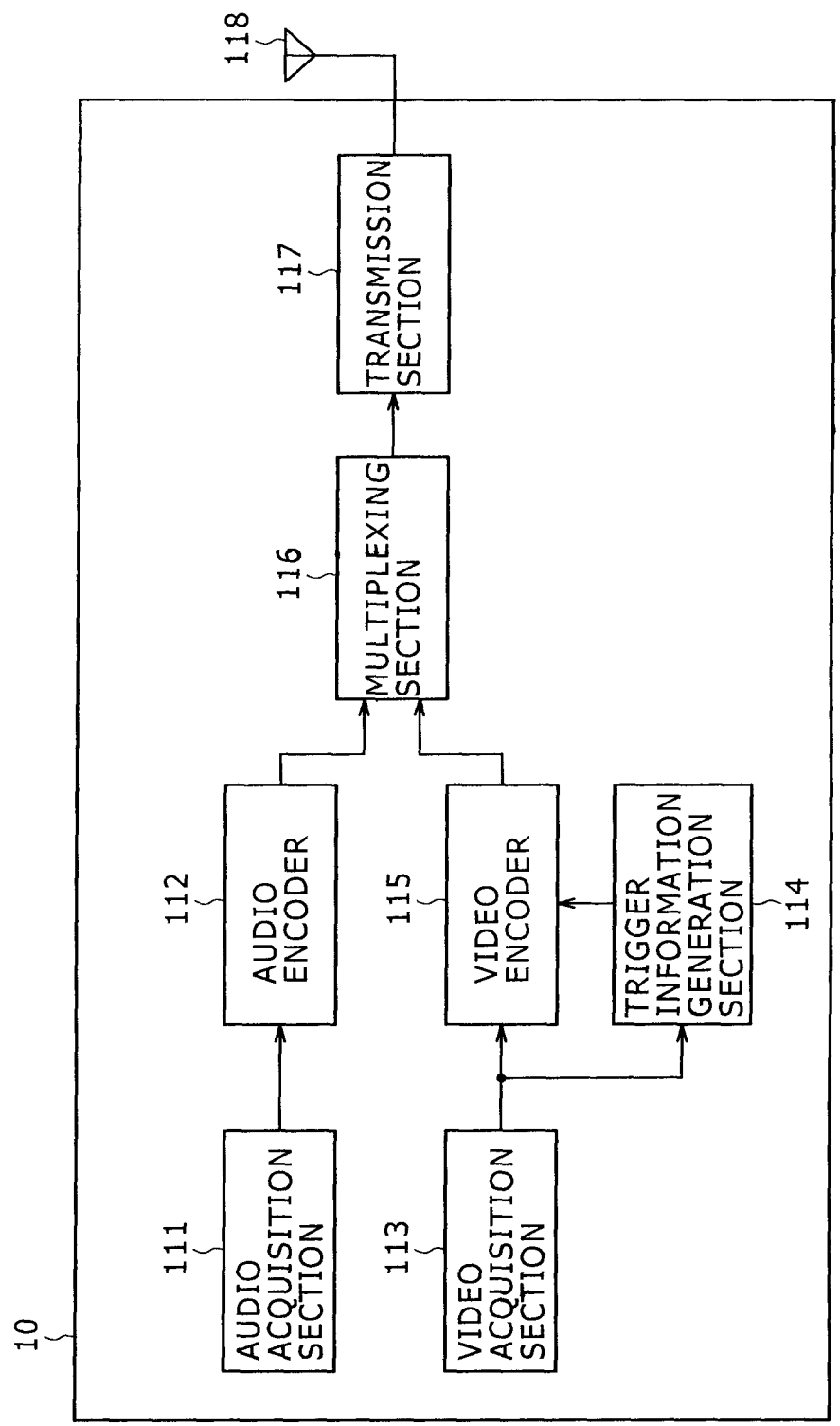
FIG. 2 is a diagram illustrating the configuration of an embodiment of a transmitter to which the present technology is applied.

FIG. 2 is a diagram illustrating the configuration of an embodiment of a transmitter to which the present technology is applied.

As illustrated in FIG. 2, the transmitter 10 includes an audio acquisition section 111, audio encoder 112, video acquisition section 113, trigger information generation section 114, video encoder 115, multiplexing section 116 and transmission section 117.

The audio acquisition section 111 acquires the audio signal of the broadcasting content from an external server, microphone, recording media or other device, supplying the audio signal to the audio encoder 112.

The audio encoder 112 encodes the audio signal, supplied from the audio acquisition section 111, in compliance with a coding scheme such as MPEG (Moving Picture Experts Group) 2, supplying the resultant audio stream to the multiplexing section 116.

The video acquisition section 113 acquires the video signal of the broadcasting content from an external server, camera, recording media or other device, supplying the video signal to the trigger information generation section 114 and video encoder 115.

The trigger information generation section 114 generates trigger information, supplying the trigger information to the video encoder 115. Trigger information is generated, for example, in response to the progress of broadcasting content for the video signal supplied from the video acquisition section 113.

The video encoder 115 encodes the video signal, supplied from the video acquisition section 113, in compliance with a coding scheme such as MPEG 2. Further, the video encoder 115 places trigger information in the video stream acquired by encoding. For example, trigger information is placed in closed caption data located in the user data area of the video stream.

The video stream containing the trigger information is supplied to the multiplexing section 116.

The multiplexing section 116 is supplied with the audio stream from the audio encoder 112 and the video stream from the video encoder 115. The same section 116 multiplexes the audio and video streams, supplying the resultant transport stream to the transmission section 117.

The transmission section 117 transmits the transport stream, supplied from the multiplexing section 116, via an antenna 118 as a broadcasting signal.

The transmitter 10 is configured as described above.

<Configuration Example of the Receiver>

Figure 3:
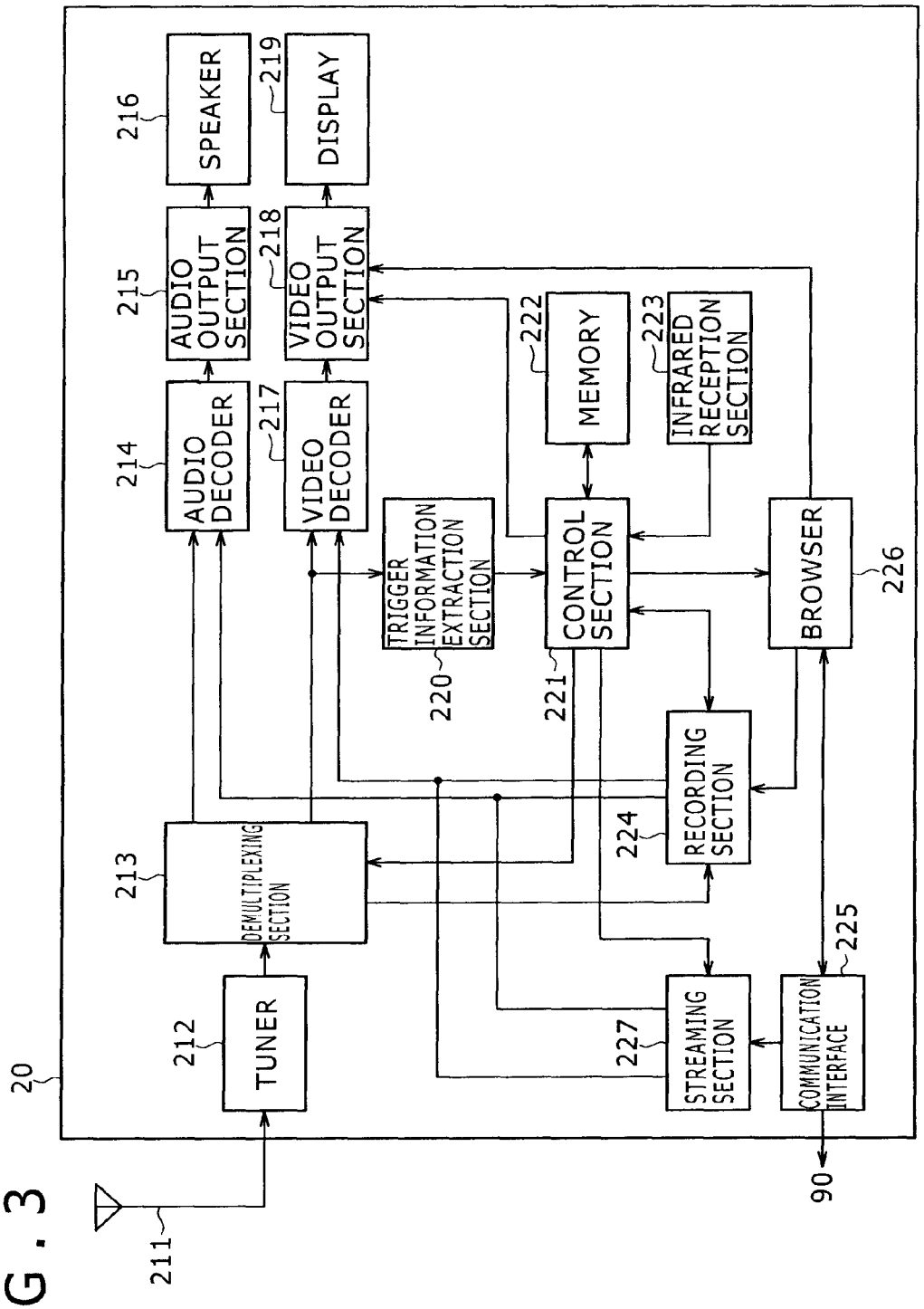
FIG. 3 is a diagram illustrating the configuration of an embodiment of a receiver to which the present technology is applied.

FIG. 3 is a diagram illustrating the configuration of an embodiment of a receiver to which the present technology is applied.

As illustrated in FIG. 3, the receiver 20 includes a tuner 212, demultiplexing section 213, audio decoder 214, audio output section 215, speaker 216, video decoder 217, video output section 218, display 219, trigger information extraction section 220, control section 221, memory 222, infrared reception section 223, recording section 224, communication interface 225, browser 226 and streaming section 227.

The tuner 212 demodulates the broadcasting signal received via an antenna 211, supplying the resultant transport stream to the demultiplexing section 213.

If a broadcasting signal is received, the demultiplexing section 213 separates the transport stream, supplied from the tuner 212, into audio and video streams, supplying these streams respectively to the audio decoder 214 and video decoder 217. Further, if broadcasting content is recorded, the same section 213 supplies the separated video and audio streams to the recording section 224 under control of the control section 221.

The audio decoder 214 decodes the audio stream, supplied from the demultiplexing section 213, using the decoding scheme that matches the coding scheme such as MPEG2 used by the audio encoder 112 (FIG. 2), supplying the resultant audio signal to the audio output section 215.

The audio output section 215 supplies the audio signal, supplied from the audio decoder 214, to the speaker 216. The speaker 216 outputs the sound of the audio signal supplied from the audio output section 215.

The video decoder 217 decodes the video stream, supplied from the demultiplexing section 213, using the decoding scheme that matches the coding scheme such as MPEG2 used by the video encoder 115 (FIG. 2), supplying the resultant video signal to the video output section 218.

The video output section 218 supplies the video signal, supplied from the video decoder 217, to the display 219. The display 219 displays the picture of the video signal supplied from the video output section 218.

The trigger information extraction section 220 constantly monitors the video stream separated by the demultiplexing section 213, extracting trigger information and supplying this information to the control section 221.

The control section 221 controls each section of the receiver 20. Further, the memory 222 stores a variety of information under control of the control section 221.

The infrared reception section 223 receives an operation signal transmitted from the remote controller 20R (FIG. 1) using infrared wireless communication, notifying the signal to the control section 221. The same section 221 controls the operation of each section of the receiver 20 based on the operation signal supplied from the infrared reception section 223.

The recording section 224 includes a large-capacity storage such as HDD (Hard Disk Drive).

If broadcasting content is recorded, the recording section 224 is supplied with audio and video streams from the demultiplexing section 213. The same section 224 records, under control of the control section 221, the data of the audio and video streams supplied from the demultiplexing section 213. As a result, recorded content (hereinafter also referred to as recorded program) is recorded to the recording section 224.

If recorded content is reproduced, the recording section 224 supplies, under control of the control section 221, the audio and video streams of the recorded content to the audio decoder 214 and video decoder 217, respectively. Then, the audio decoder 214 and video decoder 217 perform the processes described above, thus allowing the recorded content to be reproduced.

Further, a bookmark table adapted to store bookmark information is recorded to the recording section 224. Here, the term "bookmark information" refers to information about related content to be bookmarked. Bookmark information is stored in the bookmark table by the browser 226. On the other hand, the term "related content" refers to content relating to broadcasting content such as webpage, recorded content or VOD content.

If trigger information is extracted by the trigger information extraction section 220, the control section 221 controls the browser 226 to control the operation of the TDO application.

The communication interface 225 accesses the application server 30 via the Internet 90 under control of the browser 226, receiving the TDO application. The same interface 225 supplies the TDO application to the browser 226.

The browser 226 controls, under control of the control section 221, the operation of the TDO application supplied from the communication interface 225. The browser 226 generates a video signal of the TDO application, supplying the video signal to the video output section 218.

Further, the communication interface 225 accesses the web server 40 via the Internet 90 under control of the browser 226, receiving the web page. The same interface 225 supplies the web page to the browser 226.

The browser 226 generates a video signal of the web page supplied from the communication interface 225 under control of the control section 221, supplying the video signal to the video output section 218. The video output section 218 combines the video signal supplied from the video decoder 217 and that supplied from the browser 226, displaying the combined signal on the display 219.

On the other hand, the control section 221 reads the bookmark information from the bookmark table, generating a bookmark list. The video output section 218 displays the bookmark list on the display 219 under control of the control section 221.

The streaming section 227 performs various processes adapted to reproduce communication content such as VOD content through streaming under control of the control section 221.

The communication interface 225 accesses the delivery server 50 via the Internet 90 under control of the streaming section 227, receiving a VOD content stream.

The streaming section 227 separates the VOD content stream, received from the communication interface 225, into audio and video streams, supplying these streams to the audio decoder 214 and video decoder 217, respectively. As a result, the VOD content is reproduced.

The receiver 20 is configured as described above.

<Functional Configuration Example of the Control Section and Browser>

Figure 4:
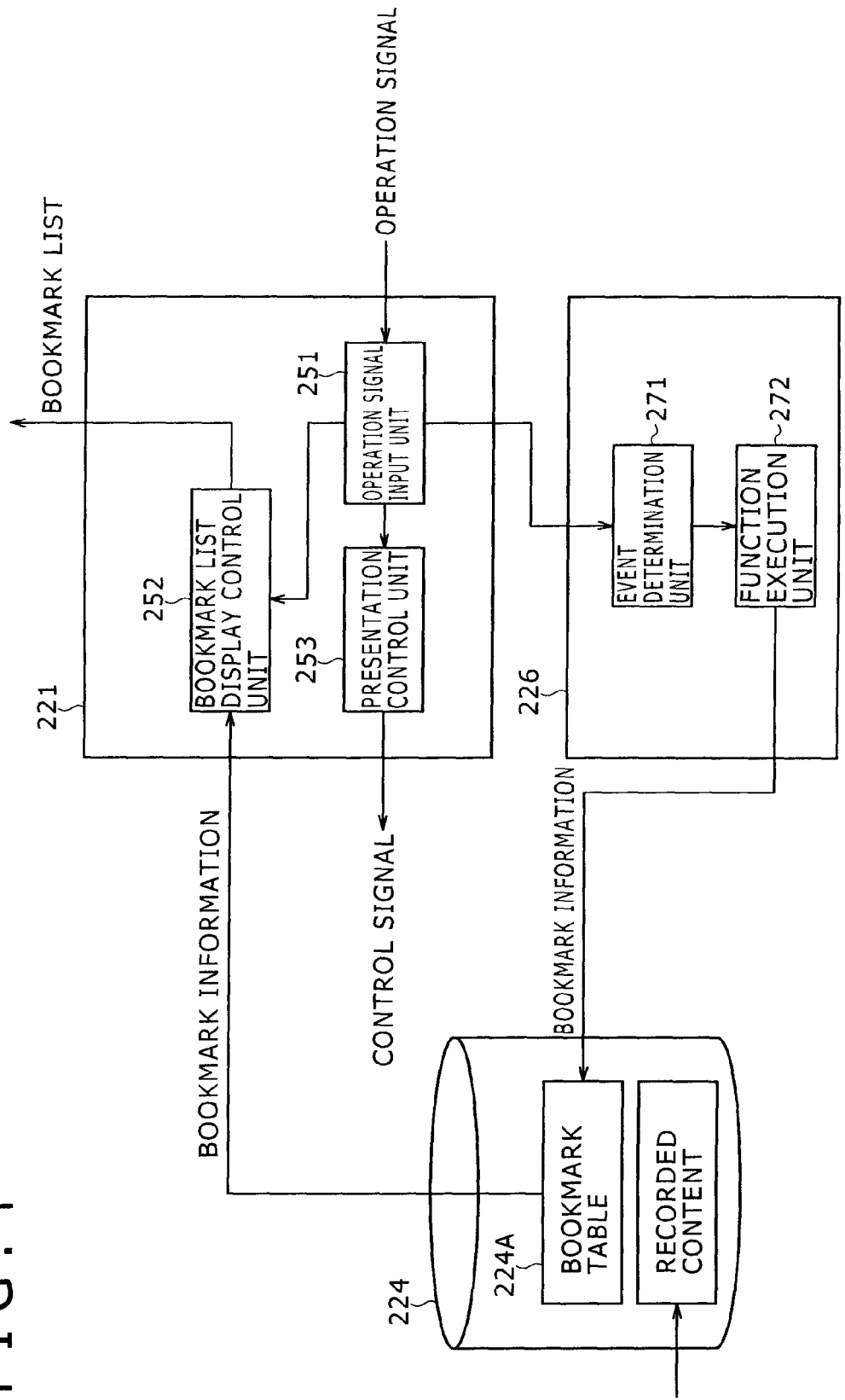
FIG. 4 is a diagram illustrating a functional configuration example of a control section and browser.

FIG. 4 is a diagram illustrating a functional configuration example of the control section 221 and browser 226. It should be noted that FIG. 4 shows only the blocks required to implement the functionalities relating to bookmark so as to simplify the description.

The control section 221 includes an operation signal input unit 251, bookmark list display control unit 252 and presentation control unit 253.

The operation signal input unit 251 supplies an operation signal from the infrared reception section 223 to the bookmark list display control unit 252 or presentation control unit 253. Further, the same unit 251 supplies the operation signal from the infrared reception section 223 to the browser 226 if an operation is performed on the TDO application.

If an instruction is issued to display the bookmark list based on the operation signal from the operation signal input unit 251, the bookmark list display control unit 252 reads the bookmark information from a bookmark table 224A. The bookmark list display control unit 252 generates a bookmark list based on the read bookmark information, supplying the list to the video output section 218. As a result, the bookmark list is displayed on the display 219.

The presentation control unit 253 controls the presentation of related content based on the operation signal from the operation signal input unit 251.

That is, the presentation control unit 253 supplies a control signal to the browser 226 to control the presentation of related content if the related content is a web page. The browser 226 acquires the web page according to the control signal from the presentation control unit 253, displaying the web page.

Further, the presentation control unit 253 supplies a control signal to the recording section 224 if the related content is recorded content. The recording section 224 supplies the audio and video streams of the recorded content respectively to the audio decoder 214 and video decoder 217 according to the control signal from the presentation control unit 253. As a result, the recorded content is reproduced.

Still further, the presentation control unit 253 supplies a control signal to the streaming section 227 if the related content is VOD content. The streaming section 227 separates the VOD stream received from the communication interface 225 into audio and video streams, supplying these streams respectively to the audio decoder 214 and video decoder 217. As a result, the VOD content is reproduced.

The browser 226 includes an event determination unit 271 and function execution unit 272.

The event determination unit 271 determines whether a given event has occurred while the TDO application is active based on the operation signal from the operation signal input unit 251 of the control section 221. The same unit 271 supplies the event determination result to the function execution unit 272.

The function execution unit 272 executes the function described in the active TDO application as a script according to the event determination result from the event determination unit 271. For example, the same unit 272 executes a bookmarking function if an instruction is issued to perform bookmarking, thus registering bookmark information of related content of interest in the bookmark table 224A.

It should be noted that given functions are defined in the script in a given script language such as JavaScript (registered trademark). Further, these functions are provided by the API (Application Programming Interface). These functions will be described in detail later with reference to FIGS. 6 to 23.

The control section 221 and browser 226 are configured as described above.

<Configuration Example of the Application Server>

Figure 5:
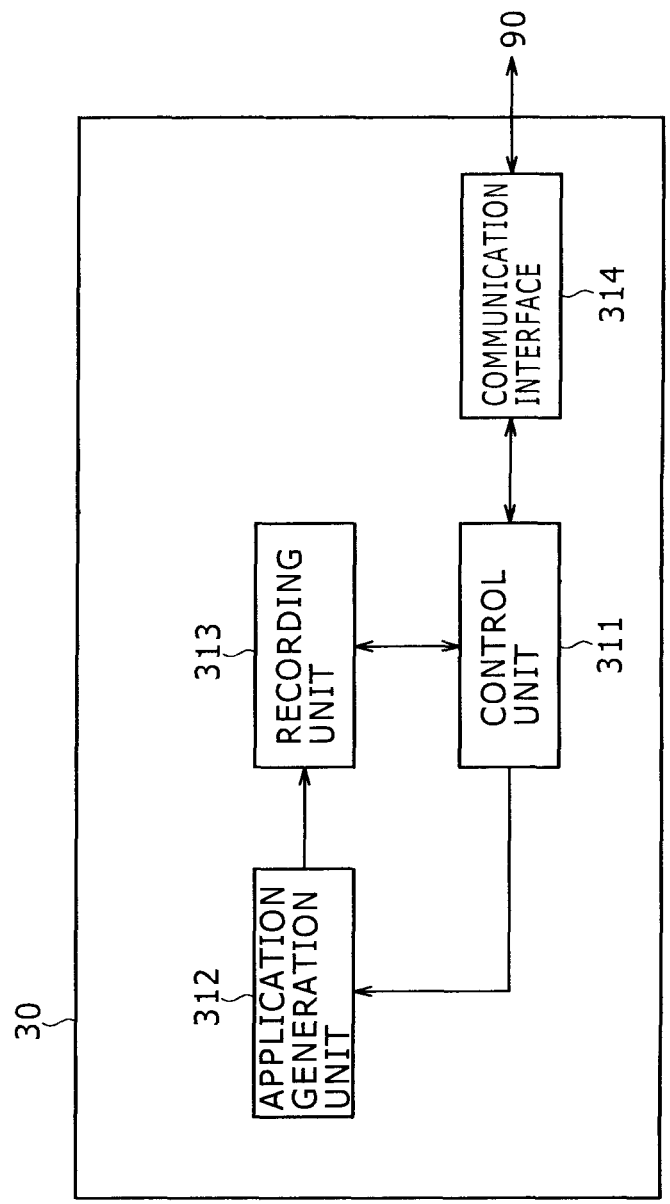
FIG. 5 is a configuration example of an application server.

FIG. 5 is a configuration example of the application server 30 shown in FIG. 1.

The application server 30 includes a control unit 311, application generation unit 312, recording unit 313 and communication interface 314.

The control unit 311 controls each section of the application server 30.

The application generation unit 312 generates a TDO application under control of the control unit 311, recording the application to the recording unit 313.

The control unit 311 reads the TDO application from the recording unit 313 if the application is requested by the receiver 20, acquiring the application.

The communication interface 314 transmits the TDO application to the receiver 20 via the Internet 90 under control of the control unit 311.

The application server 30 is configured as described above.

<Functions Written in the HTML Document of the TDO Application>

A description will be given next of the functions written in the HTML document of the TDO application as a script with reference to FIGS. 6 to 23.

(1. Bookmarking)

A description will be given first of the bookmarking function with reference to FIGS. 6 to 10. The bookmarking function will be described in detail here by taking, as examples, specific forms of operation.

Figure 6:
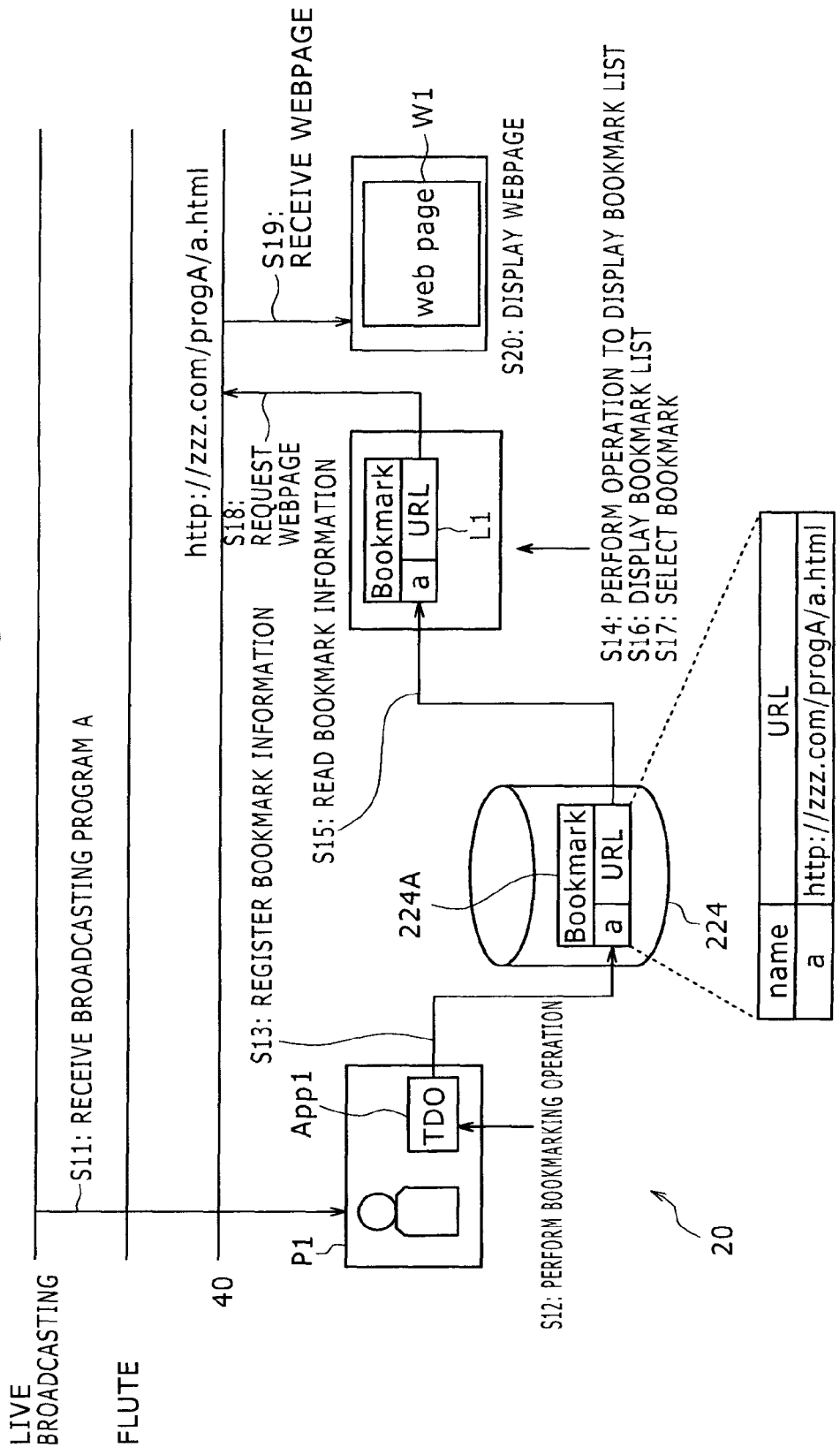
FIG. 6 is a diagram for describing a first mode of operation using a bookmarking function.

FIG. 6 is a diagram for describing a first mode of operation using the bookmarking function.

In FIG. 6, the receiver 20 is receiving a broadcasting program A (program A) (S11). A picture P1 of the broadcasting program A is displayed on the display 219. Further, a TDO application is active in the receiver 20 according to trigger information, with a picture App1 thereof displayed on the picture P1 in overlaid manner.

On the other hand, the bookmarking function is written as a script in the HTML document of the active TDO application. Here, if the user performs an operation to bookmark a web page relating to the broadcasting program A on the receiver 20 (S12), the bookmark information of the web page of interest is registered in the bookmark table 224A (S13). For example, the bookmark information includes the title (name) of the broadcasting program A or web page and the URL (Uniform Resource Locator) of the web page.

That is, if the bookmarking operation is performed on the receiver 20 while the TDO application linked to the broadcasting program A is active, the title and URL of the web page relating to the broadcasting program A are registered in the bookmark table 224A in association therewith.

Then, if the user performs an operation to display the bookmark list on the receiver 20 (S14), the bookmark information is read from the bookmark table 224A (S15). As a result, a bookmark list L1 is displayed on the display 219 (S16). The title and URL of the web page appear in the bookmark list L1.

Then, if the user selects a desired title from a list of bookmarked titles in the bookmark list L1 (S17), the receiver 20 accesses the web server 40 via the Internet 90 according to the URL associated with the title, requesting the web page of interest (S18). As a result, the web page is received from the web server 40 (S19), and a picture W1 of the web page is displayed on the display 219 (S20).

For example, if detailed information about typhoon damage in a given region is provided from a web site to the user viewing a weather forecast program on the receiver 20 shown in FIG. 6, the title of the broadcasting program or web page and the URL of the web page are associated with each other in response to the execution of the bookmarking function, registering the title and URL in the bookmark table 224A.

In the example shown in FIG. 6, a title 'a' of the broadcasting program A and the URL of the web page or "http://zzz.com/progA/a.html" are registered. Then, if the user wishes to verify detailed information about typhoon damage, he or she selects the bookmark registered in advance from the bookmark list L1 to display the picture W1 of the web page, thus making it possible to verify desired information.

It should be noted that the title and URL are merely examples of bookmark information in the first mode of operation, and that other items may be registered.

FIG. 7 is a diagram for describing the bookmarking function used in the first mode of operation.

addbookmark( ) is defined as a method in the BookmarkCollectionClass. Further, name, uri and icon are specified as arguments of addbookmark( ).

The title of the program or content is specified as the name. In the first mode of operation, the broadcasting program A and web page correspond respectively to the program and content. The title of either the program or web page is specified.

The URI (Uniform Resource Identifier) of the application server is specified as the uri. In the first mode of operation, the URL of the web server 40 is specified as URI.

Given image data is specified as the icon. In the first mode of operation, the data of the image captured from the picture P1 of the broadcasting program A displayed immediately prior to the bookmarking operation (S12 in FIG. 6) is specified. The captured image is displayed together with the title and other information when the bookmark list L1 is displayed (S16 in FIG. 6).

This concludes the description of the first mode of operation.

Figure 8:
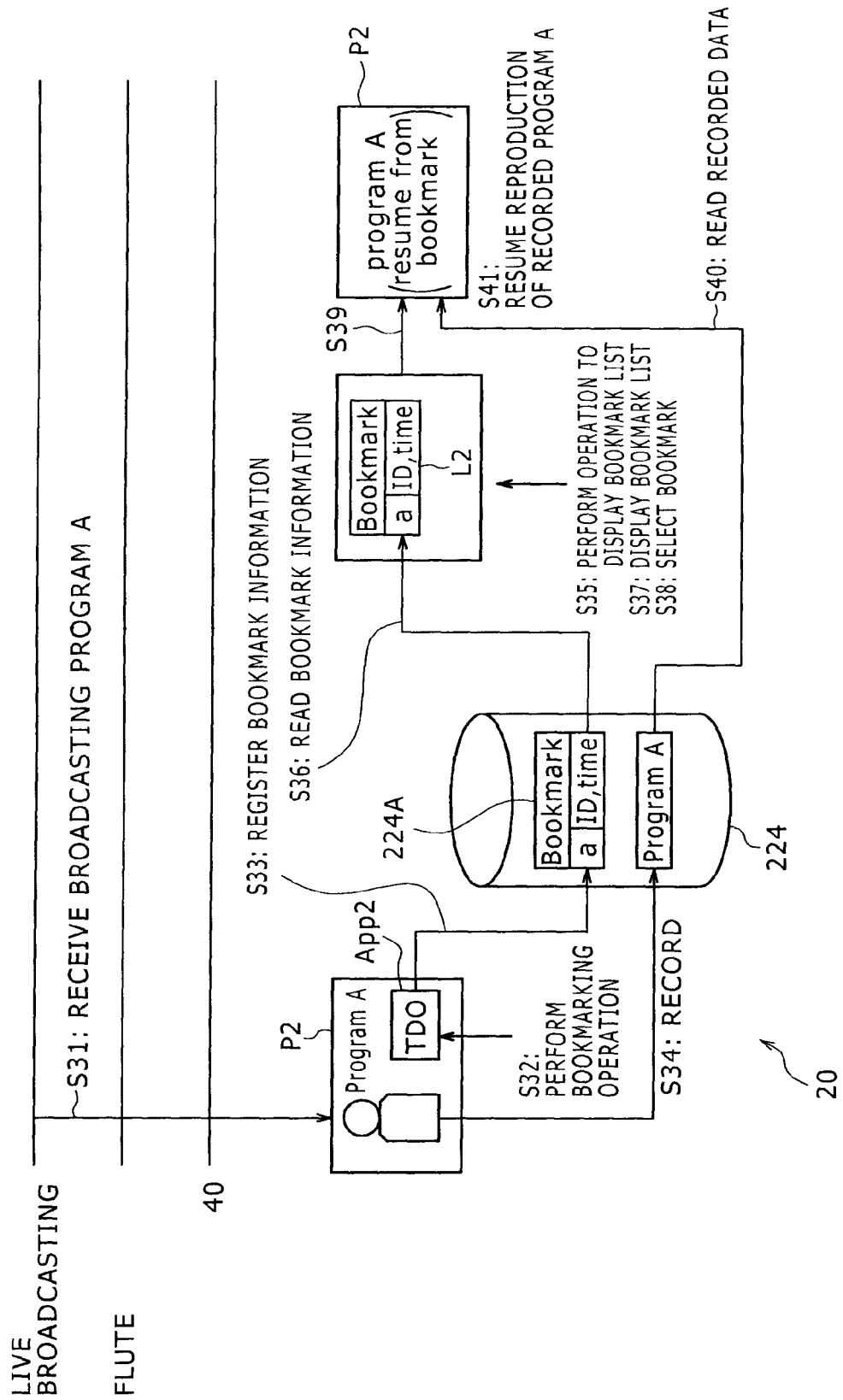
FIG. 8 is a diagram for describing a second mode of operation using the bookmarking function.

FIG. 8 is a diagram for describing a second mode of operation using the bookmarking function.

In FIG. 8, the receiver 20 is receiving the broadcasting program A (program A) (S31). A picture P2 of the broadcasting program A is displayed on the display 219. Further, the TDO application is active in the receiver 20 according to trigger information, with a picture App2 thereof displayed on the picture P2 in overlaid manner.

Here, if the user performs an operation to bookmark the broadcasting program A which he or she is viewing (S32), the bookmarking function written in the HTML document of the TDO application is executed, registering the bookmark information of a recorded program A (program A) in the bookmark table 224A (S33). Further, the recording of the broadcasting program A begins, and the recorded data of the program A is recorded to the recording section 224 (S34). For example, the bookmark information includes the title (name), identification information (ID) and reproduction start time information (time) of the broadcasting program A.

That is, if the bookmarking operation is performed on the receiver 20 while the TDO application linked to the broadcasting program A is active, the title, identification information and reproduction start time information of the recorded program A are registered in the bookmark table 224A in association therewith. Further, the recorded data of the recorded program A is recorded to the recording section 224.

Then, if the user performs an operation to display the bookmark list on the receiver 20 (S35), the bookmark information is read from the bookmark table 224A (S36). As a result, a bookmark list L2 is displayed on the display 219 (S37). The title, identification information and reproduction start time of the recorded program A appear in the bookmark list L2.

Then, if the user selects a desired title from a list of bookmarked titles in the bookmark list L2 on the receiver 20 (S38), the identification information and reproduction start time information thereof are identified (S39), and the recorded data of the recorded program A identified by the identification information is read from the recording section 224 (S40). Then, the reproduction of the recorded program A is resumed from the time specified by the reproduction start time information, and the picture P2 thereof is displayed on the display 219 (S41).

For example, if the user interrupts the broadcasting program A which he or she is viewing on the receiver 20 shown in FIG. 8, the recording of the broadcasting program A begins in response to the execution of the bookmarking function, and the title, identification information and reproduction start time information of the recorded program A are registered in the bookmark table 224A in association therewith. Then, to resume the broadcasting program A that has been interrupted, the user selects the bookmark registered in advance from the bookmark list L2, resuming the broadcasting program A from the scene where the program was interrupted.

It should be noted that the title, identification information and reproduction start time information are merely examples of bookmark information in the second mode of operation, and that other items may be registered.

FIG. 9 is a diagram for describing the bookmarking function used in the second mode of operation.

addbookmark( ) is defined as a method in the BookmarkCollectionClass. Further, time, name, uri, icon, majorChannel and minorChannel are specified as arguments of addbookmark( ).

That is, the methods shown in FIGS. 7 and 9 are common in that name, uri and icon are specified as arguments of addbookmark( ). However, the method shown in FIG. 9 differs from the counterpart shown in FIG. 7 in that time, majorChannel and minorChannel can be specified as arguments.

The reproduction start time of the program or content is specified as the time. In the second mode of operation, the broadcasting or recorded program A corresponds to the program. The time equivalent to the point in time at which the bookmarking operation was performed (S32 in FIG. 8) along the time axis of reproduction of the recorded program A is, for example, specified as the reproduction start time.

The title of the program, for example, is specified as the name. In the second mode of operation, the broadcasting or recorded program A corresponds to the program. The title of the broadcasting or recorded program A is specified.

The URI of the VOD server or local storage is specified as the uri. In the second mode of operation, the URI indicating the recorded data of the recorded program A recorded in the recording section 224 is, for example, specified.

Given image data is specified as the icon. In the second mode of operation, the data of the image captured from the picture P2 of the broadcasting program A displayed immediately prior to the bookmarking operation (S32 in FIG. 8) is specified. The captured image is displayed together with the title and other information when the bookmark list L2 is displayed (S37 in FIG. 8).

The major channel number of interest is specified as the majorChannel. Further, the minor channel number of interest is specified as the minorChannel. In the second mode of operation, the channel number of the broadcasting program A, for example, can be specified as the identification information (ID) for the majorChannel and minorChannel.

This concludes the description of the second mode of operation.

FIG. 10 is a diagram for describing a third mode of operation using the bookmarking function.

In FIG. 10, the receiver 20 is receiving the broadcasting program A (program A) (S51). A picture P3 of the broadcasting program A is displayed on the display 219. Further, the TDO application is active in the receiver 20 according to trigger information, with a picture App3 thereof displayed on the picture P3 in overlaid manner.

Here, in the receiver 20, if the user performs an operation to bookmark the broadcasting program A which he or she is viewing (S52), the bookmarking function written in the HTML document of the TDO application is executed, registering the bookmark information of a VOD program A (program A) in the bookmark table 224A (S53). For example, the bookmark information includes the title (name), URI, identification information (ID) and reproduction start time information (time) of the VOD program A.

That is, if the bookmarking operation is performed on the receiver 20 while the TDO application linked to the broadcasting program A is active, the title, URI, identification information and reproduction start time information of the VOD program A are registered in the bookmark table 224A in association therewith.

Then, if the user performs an operation to display the bookmark list on the receiver 20 (S54), the bookmark information is read from the bookmark table 224A (S55). As a result, a bookmark list L3 is displayed on the display 219 (S56). The title, URI, identification information and reproduction start time of the VOD program A appear in the bookmark list L3.

Then, if the user selects a desired title from a list of bookmarked titles in the bookmark list L3 on the receiver 20 (S57), the receiver 20 accesses the delivery server 50 via the Internet 90 according to the URI included in the bookmark information, requesting the delivery of the VOD program A having the program ID that matches the identification information (S58). Further, the delivery of the VOD program A from the time specified by the reproduction start time information is requested here. As a result, the receiver 20 begins to receive the VOD program A from the delivery server 50 (S59), resuming reproduction of the VOD program A from the time specified by the reproduction start time information and displaying the picture P3 thereof on the display 219 (S60).

For example, if the user interrupts the broadcasting program A which he or she is viewing on the receiver 20 shown in FIG. 10, in response to the execution of the bookmarking function, the title, URI, identification information and reproduction start time information of the VOD program A are registered in the bookmark table 224A in association therewith. Then, to resume the broadcasting program A that has been interrupted, the user selects the bookmark registered in advance from the bookmark list L3, resuming the VOD program A delivered from the delivery server 50 from the scene where the broadcasting program A was interrupted.

It should be noted that the title, URI, identification information and reproduction start time information are merely examples of bookmark information in the third mode of operation, and that other items may be registered.

On the other hand, the bookmarking function used in the third mode of operation is not shown because it is the same with the counterpart shown in FIG. 9 described in the second mode of operation. The following arguments are specified in the third mode of operation as the arguments of addbookmark( ).

The time equivalent to the point in time at which the bookmarking operation was performed (S52 in FIG. 10) along the time axis of reproduction of the VOD program A is, for example, specified as the time.

The title of the broadcasting or VOD program A is, for example, specified as the name.

The URI of the delivery server 50 is, for example, specified as the uri.

The data of the image captured from the picture P3 of the broadcasting program A displayed immediately prior to the bookmarking operation (S52 in FIG. 10) is specified as the icon. The captured image is displayed together with the title and other information when the bookmark list L3 is displayed (S56 in FIG. 10).

The channel number of the broadcasting program A, for example, can be specified as the identification information (ID) for the majorChannel and minorChannel.

This concludes the description of the third mode of operation.

As described above, it is possible to provide a common control method adapted to bookmark related content such as web page, recorded content or VOD content by defining the bookmarking function.

It should be noted that "FLUTE" is shown in FIGS. 6, 8 and 10. A broadcasting signal is transmitted from the transmitter 10 as ordinary or NRT broadcasting and, in the case of NRT broadcasting, a FLUTE (File Delivery over Unidirectional Transport) session is used. "FLUTE" is shown on the assumption that a FLUTE session is used. The details of FLUTE are defined as RFC3926. Here, the term "NRT (Non Real Time) broadcasting" refers to broadcasting which is not predicated on being viewed in real time and transmits NRT content data using a broadcasting signal. Although not described in the first to third modes of operation, NRT content may be broadcasting content or related content.

A description will be given next of the functions other than the bookmarking function.

(2. Change Video Angle/3. Change Audio Tracks)

In FIG. 11, methods and their arguments are defined as Media playback extensions to video/broadcast. Further, various properties are defined by the AVComponent class in FIG. 12.

(4. Change Channel)

In FIG. 13, methods and their arguments are defined as the video/broadcast embedded object.

(5. Channel Information)

In FIG. 14, methods and their arguments are defined as the video/broadcast embedded object. On the other hand, an attribute is defined by the Channel config class. Further, methods and their arguments are defined by the ChannelList class.

Further, in FIG. 15, various properties are defined by the Channel class.

(6. Screen Size and Resolution)

As illustrated in FIG. 16, the screen size can be directly acquired from the video object property. It should be noted, however, that the screen size must be added as the property.

(7. Closed Caption Control)

In FIG. 17, methods and their arguments are defined as Media playback extensions to video/broadcast.

(8. Audio Track Information)

Figure 18:
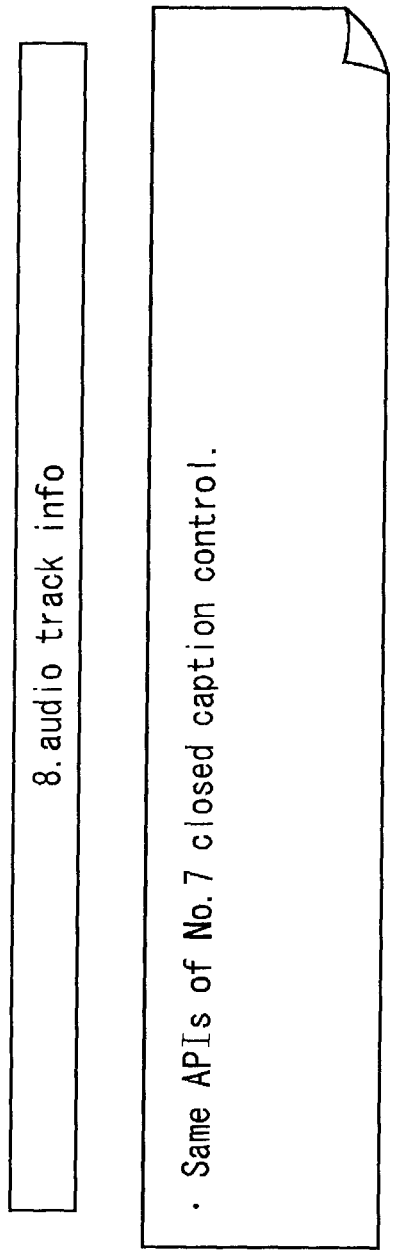
FIG. 18 is a diagram for describing an audio track information function.

As illustrated in FIG. 18, the APIs for audio track information are the same as those for "7. Closed Caption Control."

(9. PVR)

In FIG. 19, methods and their arguments are defined as Scheduled Recording APIs.

(10. NRT Content)

FIGS. 20 to 23 illustrate the functions relating to NRT content.

FIG. 20 illustrates a function adapted to reserve the download of NRT content. In FIG. 20, the registerNRTContent method and its arguments are defined.

FIG. 21 illustrates a function adapted to cancel the download reservation of NRT content. In FIG. 21, the remove methods and their arguments are defined.

FIG. 22 illustrates a function adapted to acquire the download status of NRT content whose download has been reserved. In FIG. 22, the getNRTContents method and its argument and the item method and its argument are defined.

FIG. 23 illustrates the functions relating to NRT content other than those shown in FIGS. 20 to 22.

Start NRT download instantly is a function adapted to start the download of NRT content. Terminate NRT download instantly is a function adapted to terminate the download of NRT content. Delete local NRT content is a function adapted to delete downloaded NRT content and its related information. Get Information of NRT content is a function adapted to acquire detailed information about downloaded NRT content.

This concludes the description of the functions written in the HTML document of the TDO application as a script.

<Specific Processes Performed by Each of the Devices>

A description will be given next of the specific processes performed by each of the devices making up the broadcasting-communication coordination system 1 shown in FIG. 1.

(Transmission Process)

A description will be given first of the transmission process performed by the transmitter 10 with reference to the flowchart shown in FIG. 24.

In step S111, the audio acquisition section 111 acquires an audio signal for the sound of the broadcasting content, for example, from an external server. Further, in step S112, the video acquisition section 113 acquires a video signal for the picture of the broadcasting content, for example, from an external server.

In step S113, the trigger information generation section 114 determines whether to transmit trigger information. When it is determined in step S113 that trigger information will be transmitted, the process proceeds to step S114.

In step S114, the trigger information generation section 114 generates trigger information that matches the progress of the picture of the video signal acquired by the video acquisition section 113. On the other hand, if it is determined in step S113 that trigger information will not be transmitted, the process in step S114 is skipped, causing the process to proceed to step S115.

In step S115, the audio encoder 112 encodes the audio signal acquired by the audio acquisition section 111, generating an audio stream.

In step S116, the video encoder 115 encodes the video signal acquired by the video acquisition section 113, generating a video stream. Further, the video encoder 115 places the trigger information in the closed caption data in the user data area of the video stream when the trigger information is generated in step S114.

In step S117, the multiplexing section 116 multiplexes the audio stream from the audio encoder 112 and the video stream from the video encoder 115, generating a transport stream.

In step S118, the transmission section 117 transmits, as a broadcasting signal, the transport stream generated by the multiplexing section 116 via the antenna 118. Then, the process returns to step S111 to repeat the subsequent processes.

This concludes the description of the transmission process.

(Reception Process)

A description will be given next of the reception process performed by the receiver 20 with reference to the flowchart shown in FIG. 25.

In step S211, the tuner 212 receives a broadcasting signal via the antenna 211, demodulating the broadcasting signal.

In step S212, the demultiplexing section 213 separates the transport stream, demodulated by the tuner 212, into audio and video streams.

In step S213, the audio decoder 214 decodes the audio stream separated by the demultiplexing section 213, generating an audio signal.

In step S214, the video decoder 217 decodes the video stream separated by the demultiplexing section 213, generating a video signal.

In step S215, the speaker 216 outputs the sound for the audio signal. On the other hand, the display 219 displays the picture for the video signal. As a result, the display 219 displays the picture of the broadcasting content such as broadcasting program or the like, and the speaker 216 outputs the sound for the picture.

In step S216, the control section 221 determines whether trigger information has been received from the transmitter 10. When it is determined in step S216 that trigger information has been received, the process proceeds to step S217.

In step S217, the control section 221 controls the browser 226 based on the trigger information extracted from the trigger information extraction section 220, performing the trigger information handling process. More specifically, the browser 226 controls the operation such as the acquisition or execution (activation) of a TDO application, firing of an event or termination of the application under control of the control section 221.

On the other hand, if it is determined that trigger information has not been received in step S216, step S217 is skipped. Then, the process returns to step S211 to repeat the subsequent processes.

This concludes the description of the reception process.

(Event Determination Process)

A description will be given next of the event determination process performed by the browser 226 with reference to the flowchart shown in FIG. 26.

In step S231, the browser 226 determines whether a TDO application is active. When it is determined in step S231 that the TDO application is active, the process proceeds to step S232.

In step S232, the event determination unit 271 determines whether a given event has occurred. When it is determined in step S232 that a given event has occurred, the process proceeds to step S233.

In step S233, the event determination unit 271 and function execution unit 272 perform the event handling process. In the event handling process, the function matching the event that has occurred is executed. It should be noted that the event handling process will be described in detail later with reference to the flowchart shown in FIG. 27.

When the event handling process in step S233 ends, the process proceeds to step S234. On the other hand, if it is determined in step S232 that a given event has not occurred, the event handling process in step S233 is skipped, causing the process to proceed to step S234.

In step S234, the browser 226 determines whether the TDO application has been terminated.

When it is determined in step S234 that the TDO application is active, the process returns to step S232 to repeat the subsequent processes. On the other hand, if it is determined that the TDO application has been terminated, the process returns to step S231 to repeat the subsequent processes.

This concludes the description of the event determination process.

(Event Handling Process)

A description will be given next of the event handling process for step S233 shown in FIG. 26 with reference to the flowchart shown in FIG. 27.

In step S251, the event determination unit 271 determines whether an instruction has been issued to perform bookmarking based on the operation signal from the operation signal input unit 251. When it is determined in step S251 that an instruction has been issued to perform bookmarking, the process proceeds to step S252.

In step S252, the function execution unit 272 executes the addbookmark method (function) of the Bookmark Collection Class written as a script in the active TDO application (HTML document). The execution of this bookmarking function allows the bookmark information of the related content of interest to be registered in the bookmark table 224A.

On the other hand, if it is determined in step S251 that no instruction has been issued to perform bookmarking, that is, if it is determined that an event other than bookmarking operation has occurred, the process proceeds to step S253.

Figure 26:
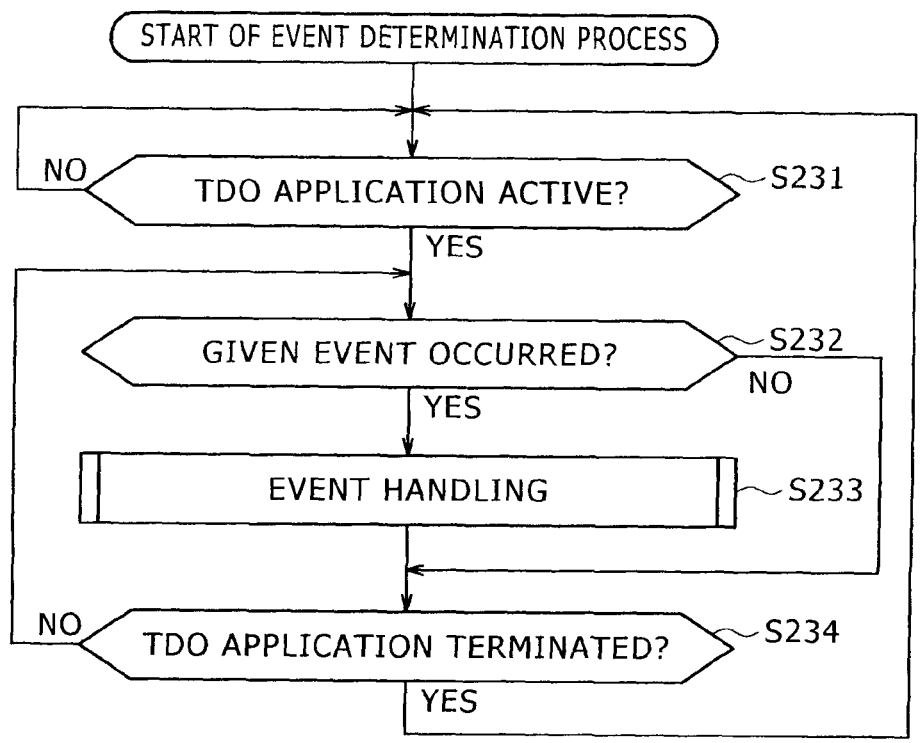
FIG. 26 is a flowchart for describing an event determination process.

In step S253, the function execution unit 272 executes the function (method) matching the event that has occurred in step S232 shown in FIG. 26 according to the event determination result from the event determination unit 271.

Figure 27:
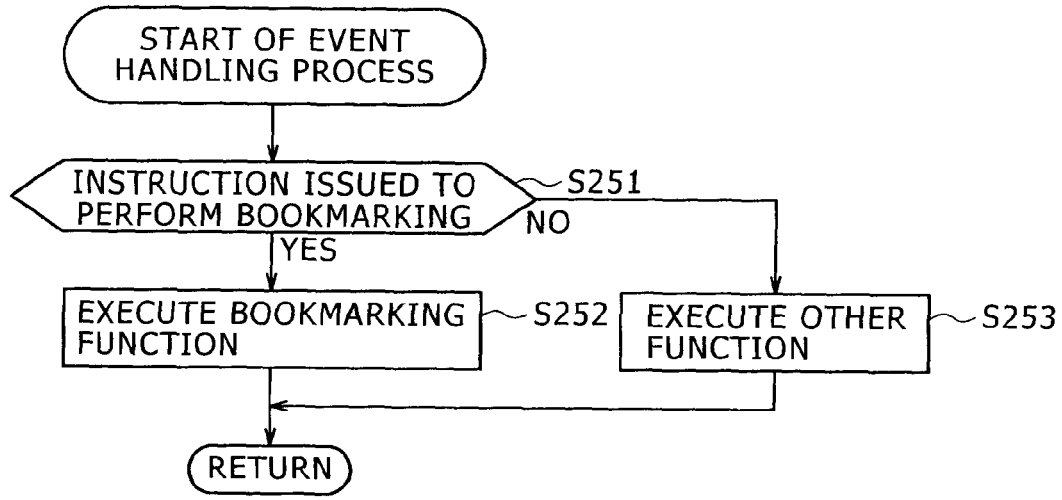
FIG. 27 is a flowchart for describing an event handling process.

That is, for simplification of description, although only the case was described in which the bookmarking function is executed in the event handling process shown in FIG. 27, no description is given here. For example, the functions shown in FIGS. 11 to 23 are executed in response to various events.

When the process in step S252 or S253 ends, the event handling process ends. Then, the process returns to step S233 shown in FIG. 26 to repeat the subsequent processes.

This concludes the description of the event handling process.

(Related Content Presentation Process)

Figure 28:
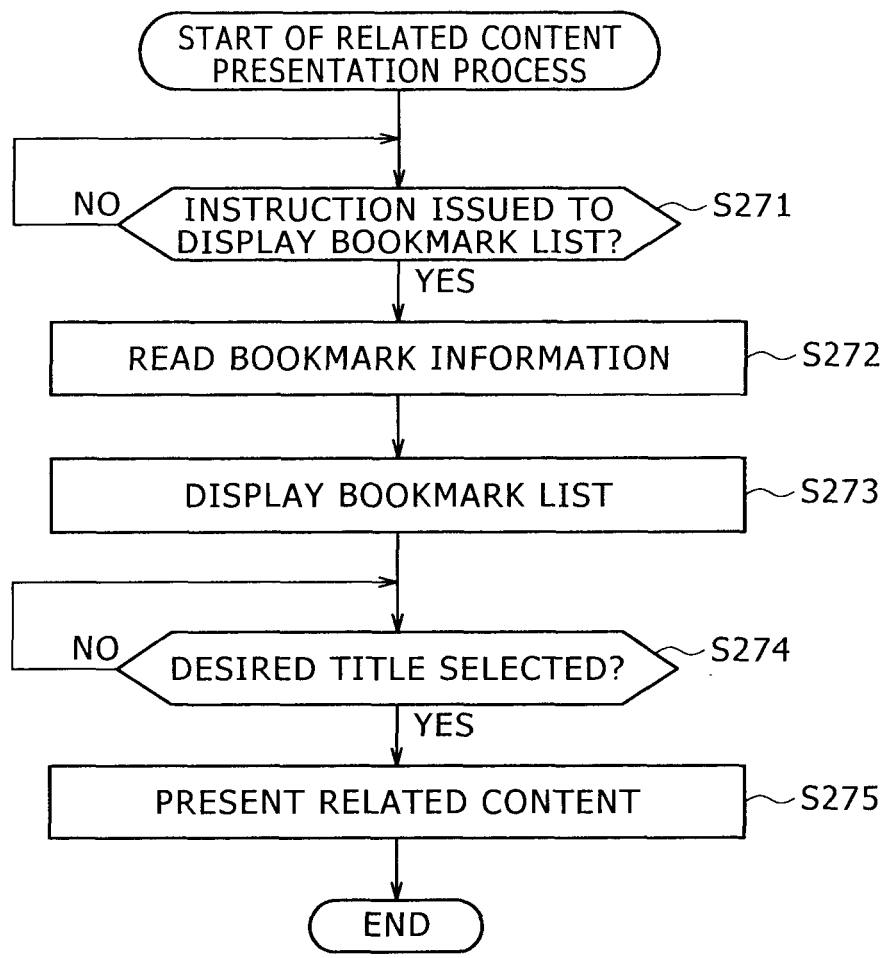
FIG. 28 is a flowchart for describing a related content presentation process.

A description will be given next of the related content presentation process performed by the control section 221 with reference to the flowchart shown in FIG. 28.

In step S271, the bookmark list display control unit 252 determines whether an instruction has been issued to display the bookmark list based on the operation signal from the operation signal input unit 251. When it is determined in step S271 that an instruction has been issued to display the bookmark list, the process proceeds to step S272.

In step S272, the bookmark list display control unit 252 reads the bookmark information from the bookmark table 224A.

In step S273, the bookmark list display control unit 252 controls the video output section 218 to display the bookmark list on the display 219. It should be noted that the bookmark list may be displayed by the browser 226.

In step S274, the presentation control unit 253 determines whether a desired title has been selected from a list of bookmarked titles in the bookmark list based, for example, on the operation signal from the operation signal input unit 251. In step S274, a wait is made until a desired title is selected, and then the process proceeds to step S275.

In step S275, the presentation control unit 253 controls the presentation of the related content matching the selected title based on the operation signal from the operation signal input unit 251. Here, content such as web page, recorded content or VOD content relating to the broadcasting content is presented as related content as described above.

This concludes the description of the related content presentation process.

(TDO Application Delivery Process)

Figure 29:
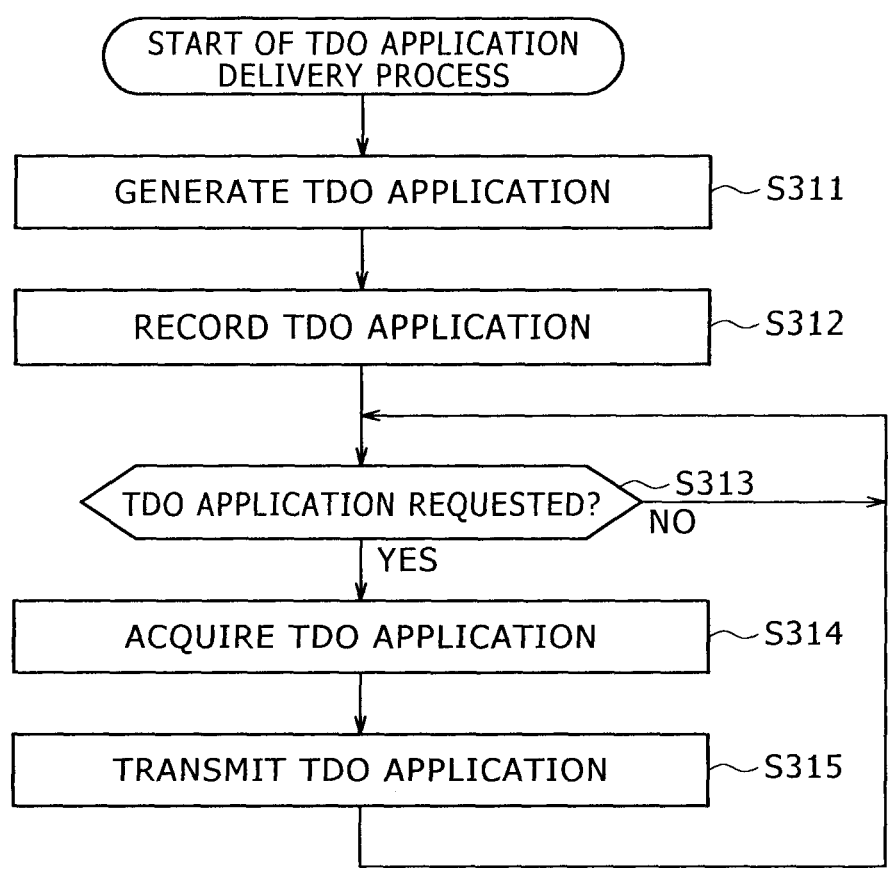
FIG. 29 is a flowchart for describing a TDO application delivery process.

A description will be given next of the TDO application delivery process performed by the application server 30 with reference to the flowchart shown in FIG. 29.

In step S311, the application generation unit 312 generates a TDO application under control of the control unit 311.

In step S312, the application generation unit 312 records the generated TDO application to the recording unit 313 under control of the control unit 311.

More specifically, the TDO application is created as an HTML document made up of a variety of text and material data. Further, the bookmarking and other functions are embedded as scripts according to the purpose of use of the application. That is, if the creator of the TDO application wishes to include a process adapted to perform bookmarking, he or she can implement the functionality by using the functions defined as a common control method.

In step S313, the control unit 311 determines, by monitoring the communication interface 314, whether the receiver 20 has requested the TDO application. In step S313, a wait is made for a request from the receiver 20, and the process proceeds to step S314.

In step S314, the control unit 311 acquires, from the recording unit 313, the TDO application matching the request from the receiver 20. In step S315, the control unit 311 controls the communication interface 314 to transmit the acquired TDO application to the receiver 20.

When the transmission process ends in step S315, the process returns to step S313 to repeat the subsequent processes.

This concludes the description of the TDO application delivery process.

As described above, the present technology provides various common control methods by defining the functions shown in FIGS. 6 to 23. In particular, it is possible to provide a common control method adapted to bookmark related content by defining the bookmarking function shown in FIGS. 6 to 10.

Modification Example

It should be noted that although it has been described that the functions shown in FIGS. 6 to 23 are written as scripts in the TDO application (HTML document), these functions provide the same functionalities even if they are written as scripts in other HTML document such as NDO or PDO application.

Here, the term "NDO (NRT Declarative Object) application" refers to an application program used to provide a process relating to NRT content. Unlike a TDO application, an NDO application is not executed according to trigger information. On the other hand, the term "PDO (Plain Declarative Object) application" refers to an application program executable only by a particular browser. It should be noted, however, that although it has been described that "DO" of TDO, NDO and PDO represents the acronym for Declarative Object, "DO" may also represent the acronym for Downloadable Object.

Further, although the description has been given above by taking JavaScript (registered trademark) as a script language, other script language or computer language may be used. Still further, although it has been described above that TDO, NDO and PDO include an HTML document, they may include a document written in other computer language.

Still further, although the case has been described above in which a TDO application is provided from the application server 30 via the Internet 90, a TDO application may be supplied over a broadcasting wave using a FLUTE session. The same is true for NDO and PDO applications. Alternatively, broadcasting content transmitted from the transmitter 10 may be delivered via the Internet 90, for example, from the delivery server 50 connected to the Internet 90 as communication content.

Still further, although it has been described above that the receiver 20 is a television receiver, the receiver 20 is not limited thereto. For example, the receiver 20 may be devoid of a display and speaker so that its functionalities are built into a piece of electronic equipment such as video recorder. Still further, the present technology is not limited in application to television receivers. Instead, the present technology is applicable, for example, to electronic equipment capable of acquiring content such as personal computers, tablet terminals and mobile phones.

<Description of the Computer to which the Present Technology is Applied>

It should be noted that the above series of processes may be performed by hardware or software. If the series of processes are performed by software, the program making up the software is installed to a computer. Here, the computer includes a computer incorporated in dedicated hardware and a general-purpose personal computer capable of performing various functionalities when installed with various programs.

FIG. 30 is a block diagram illustrating a hardware configuration example of a computer adapted to perform the above series of processes using a program.

In a computer 900, a CPU (Central Processing Unit) 901, ROM (Read Only Memory) 902 and RAM (Random Access Memory) 903 are connected to each other via a bus 904.

An I/O interface 905 is further connected to the bus 904. An input section 906, output section 907, storage section 908, communication section 909, and drive 910 are connected to the I/O interface 905.

The input section 906 includes, for example, a keyboard, mouse and microphone. The output section 907 includes, for example, a display and speaker. The storage section 908 includes, for example, a harddisk or non-volatile memory. The communication section 909 includes, for example, a network interface. The drive 910 drives a removable media 911 such as magnetic disk, optical disk, magneto-optical disk or semiconductor memory.

In the computer 900 configured as described above, the CPU 901 loads the program from the storage section 908 into the RAM 903 for execution via the I/O interface 905 and bus 904, thus allowing the above series of processes to be performed.

The program executed by the computer 900 (CPU 901) may be supplied, for example, stored in the removable media 911 as a package media. Alternatively, the program may be supplied via a wired or wireless transmission media such as a local area network, the Internet or digital satellite broadcasting.

In the computer 900, the program may be installed to the storage section 908 via the I/O interface 905 by inserting the removable media 911 into the drive 910. Alternatively, the program may be received with the communication section 909 via a wired or wireless transmission media and installed to the storage section 908. Still alternatively, the program may be installed in advance in the ROM 902 or storage section 908.

It should be noted that the program executed by the computer 900 may perform the processes not only chronologically according to the sequence described in the present specification but also in parallel or when necessary as when invoked.

Here, the process steps writing the program adapted to allow the computer 900 to perform various processes need not necessarily do so chronologically in the sequence described in the flowchart. Instead, these steps include those processes performed in parallel or individually (e.g., parallel and object-based processes).

On the other hand, the program may be executed by a single computer or by a plurality of computers in a distributed manner. Further, the program may be transferred to a remote computer for execution.

Further, the term "system" in the present specification refers to a collection of a plurality of constituent elements (e.g., devices and modules (parts)), irrespective of whether all the constituent elements are housed in the same enclosure. Therefore, a plurality of devices connected to each other via a network and housed in individual enclosures, and a device with a plurality of modules housed in a single enclosure are both systems.

It should be noted that the embodiments of the present technology are not limited to those described above but may be modified in various ways without departing from the scope of the present technology.

For example, the present technology may take on a cloud computing configuration in which a plurality of devices share the load and collaborate in processing a single functionality.

On the other hand, each of the steps described in the above flowcharts may be performed not only by a single device but also by a plurality of devices in a load-sharing fashion.

Further, if a single step includes a plurality of processes, the plurality of processes included in the single step may be performed not only by a single device but also by a plurality of devices in a load-sharing fashion.

It should be noted that the present technology may have the following configurations.

(1)

A receiver including:

a reception section adapted to receive AV, namely audio and visual content;

a registration section adapted to register related content relating to the AV content based on control information included in an application program executed in response to the AV content; and a presentation control unit adapted to exercise control in such a manner that if the registered related content is selected, the selected related content is presented.

(2)

The receiver of feature (1), in which the registration section registers the related content if a given event occurs while the application program is active.

(3)

The receiver of feature (1) or (2), in which the registration section registers registration information relating to the related content to be registered to a recording section, and the presentation control unit presents the related content selected from a list that matches the registration information.

(4)

The receiver of feature (3), in which the related content is a webpage, the registration section registers, as the registration information, the URL (Uniform Resource Locator) of the webpage, and the presentation control unit displays the webpage acquired according to the URL.

(5)

The receiver of feature (3), in which the related content is recorded content obtained by recording the AV content, the registration section registers, as the registration information, identification information of the recorded content, and the presentation control unit reproduces the recorded content specified by the identification information.

(6)

The receiver of feature (5), in which the registration section registers, as the registration information, time information indicating the reproduction start time of the recorded content together with the identification information, and the presentation control unit reproduces the recorded content specified by the identification information from the time indicated by the time information.

(7)

The receiver of feature (3), in which the related content is VOD (Video On Demand) content, the registration section registers, as the registration information, identification information of the VOD content, and the presentation control unit reproduces the VOD content acquired according to the identification information.

(8)

The receiver of feature (7), in which the registration section registers, as the registration information, time information indicating the reproduction start time of the VOD content together with the identification information, and the presentation control unit reproduces the VOD content specified by the identification information from the time indicated by the time information.

(9)

The receiver of any one of features (1) to (8), in which the control information is a function used to register the related content, and the registration section executes the function if an instruction is issued to register the related content.

(10)

The receiver of any one of features (1) to (9), in which the application program is an HTML (Hyper Text Markup Language) document written in HTML, and the control information is a function written as a script in the HTML document.

(11)

The receiver of any one of features (1) to (10), in which the AV content is transmitted through a broadcasting wave, and the application program is delivered via the Internet.

(12)

A reception method of a receiver including the steps of the receiver:

receiving AV content;

registering related content relating to the AV content based on control information included in an application program executed in response to the AV content; and exercising control in such a manner that if the registered related content is selected, the selected related content is presented.

(13)

A transmitter including:

an acquisition section adapted to acquire an application program to be executed in response to AV content; and a transmission section adapted to transmit the application program, in which the application program includes control information used to register related content relating to the AV content.

(14)

A transmission method of a transmitter including the steps of the transmitter:
acquiring an application program to be executed in response to AV content; and
transmitting the application program, in which
the application program includes control information used to register related content relating to the AV content.

What is claimed is:

1. A receiver comprising:
circuitry configured to
receive a broadcasting signal, the broadcasting signal including AV (audio and visual) content and control information synchronized with the AV content,
activate a downloadable application program responsive to the control information, the downloadable application program having a URL (uniform resource locator) of related content relating to the AV content defined therein,
execute a function of the downloadable application program to register the URL responsive to occurrence of a user input event while the downloadable application program is active, and
exercise control in such a manner that when the registered URL of the related content is selected, the related content is output for display.

2. The receiver of claim 1, wherein the circuitry is configured to
store registration information relating to the related content in a memory, and
present the related content selected from a list that matches the registration information.

3. The receiver of claim 2, wherein
the related content is a webpage, and
the circuitry is configured to
store, as the registration information, the URL of the webpage, and
output for display the webpage acquired according to the URL.

4. The receiver of claim 2, wherein
the related content includes recorded content obtained by recording the AV content, and
the circuitry is configured to
store, as the registration information, identification information of the recorded content, and
reproduce the recorded content specified by the identification information.

5. The receiver of claim 4, wherein the circuitry is configured to
store, as the registration information, time information indicating the reproduction start time of the recorded content together with the identification information, and
reproduce the recorded content specified by the identification information from the time indicated by the time information.

6. The receiver of claim 2, wherein
the related content includes VOD (Video On Demand) content, and
the circuitry is configured to
store, as the registration information, identification information of the VOD content, and
output for display the VOD content acquired according to the identification information.

7. The receiver of claim 6, wherein the circuitry is configured to store, as the registration information, time information indicating the reproduction start time of the VOD content together with the identification information, and
output for display the VOD content specified by the identification information from the time indicated by the time information.

8. The receiver of claim 1, wherein
the user input event corresponds to receiving an instruction to register the URL of the related content.

9. The receiver of claim 1, wherein
the downloadable application program is an HTML (Hyper Text Markup Language) document written in HTML, and
the function is written as a script in the HTML document.

10. The receiver of claim 1, wherein
the downloadable application program is delivered via the Internet.

11. A reception method of a receiver comprising:
receiving, by circuitry of the receiver, a broadcasting signal, the broadcasting signal including AV (audio and visual) content and control information synchronized with the AV content;
activating a downloadable application program responsive to the control information, the downloadable application program having a URL (uniform resource locator) of related content relating to the AV content defined therein,
executing, by the circuitry, a function of the downloadable application program to register the URL responsive to occurrence of a user input event while the downloadable application program is active; and
exercising control in such a manner that when the registered URL of the related content is selected, the related content is output for display.

12. A transmitter comprising:
circuitry configured to
acquire a downloadable application program to be activated responsive to control information synchronized with AV content, the control information and the AV content being included in a broadcasting signal, and
transmit the downloadable application program, wherein
the downloadable application program includes information indicating a URL (uniform resource locator) of related content relating to the AV content, and comprises a function that, when being executed responsive to occurrence of a user input event while the downloadable application program is active, registers the URL.

13. A transmission method of a transmitter comprising:
acquiring, by circuitry of the transmitter, a downloadable application program to be activated responsive to control information synchronized with AV content, the control information and the AV content being included in a broadcasting signal; and
transmitting, by the circuitry, the downloadable application program, wherein
the downloadable application program includes information indicating a URL (uniform resource locator) of related content relating to the AV content, and comprises a function that, when being executed responsive to occurrence of a user input event while the downloadable application program is active, registers the URL.

14. The receiver of claim 1, further comprising:
a memory, wherein
the downloadable application is configured to cause the circuitry to store the URL in the receiver's set of Links, which is stored in the memory.

15. The receiver of claim 1, wherein the circuitry is configured to receive a plurality of downloadable application programs from different television broadcasters.

16. The receiver of claim 15, wherein each of the plurality of downloadable application programs is programmed to cause the circuitry to store a different URL in the receiver's set of Links.

17. The receiver of claim 1, wherein the control information comprises trigger information.

18. The transmitter of claim 12, wherein the control information comprises trigger information.

* * * * *